(12) United States Patent
Okuno et al.

(10) Patent No.: US 9,048,025 B2
(45) Date of Patent: Jun. 2, 2015

(54) ELECTRODE FOR ELECTRIC STORAGE DEVICE, ELECTRIC STORAGE DEVICE AND MANUFACTURING METHOD OF ELECTRODE FOR ELECTRIC STORAGE DEVICE

(71) Applicants: SUMITOMO ELECTRIC INDUSTRIES, LTD., Osaka-shi, Osaka (JP); MEIDENSHA CORPORATION, Tokyo (JP)

(72) Inventors: Kazuki Okuno, Itami (JP); Akihisa Hosoe, Osaka (JP); Masatoshi Majima, Itami (JP); Yoshihiro Nakai, Osaka (JP); Takayuki Noguchi, Tokyo (JP); Daisuke Komatsu, Tokyo (JP); Daisuke Iida, Tokyo (JP); Masashi Yamamoto, Tokyo (JP); Masamichi Kuramoto, Tokyo (JP)

(73) Assignees: SUMITOMO ELECTRIC INDUSTRIES, LTD., Osaka-shi, Osaka (JP); MEIDENSHA CORPORATION, Tokyo (JP)

( * ) Notice: Subject to any disclaimer, the term of this patent is extended or adjusted under 35 U.S.C. 154(b) by 242 days.

(21) Appl. No.: 13/675,545

(22) Filed: Nov. 13, 2012

(65) Prior Publication Data
US 2013/0148265 A1 Jun. 13, 2013

Related U.S. Application Data

(60) Provisional application No. 61/652,989, filed on May 30, 2012.

(30) Foreign Application Priority Data

Nov. 14, 2011 (JP) ................................. 2011-248520
Mar. 28, 2012 (JP) ................................. 2012-073293
May 29, 2012 (JP) ................................. 2012-122389

(51) Int. Cl.
*H01G 11/34* (2013.01)
*H01G 9/048* (2006.01)
(Continued)

(52) U.S. Cl.
CPC ............. *H01G 9/048* (2013.01); *Y10S 977/948* (2013.01); *B82Y 99/00* (2013.01); *H01G 11/24* (2013.01);
(Continued)

(58) Field of Classification Search
CPC ....... H01G 11/06; H01G 11/28; H01G 11/36; H01G 11/70; H01G 9/048; H01G 11/24; H01G 11/26; H01G 11/30
USPC ......................................................... 361/502
See application file for complete search history.

(56) References Cited

U.S. PATENT DOCUMENTS

| | | | |
|---|---|---|---|
| 2008/0138704 A1 | 6/2008 | Mizuta et al. | |
| 2008/0318049 A1* | 12/2008 | Hata et al. ...................... | 428/408 |
| 2009/0122467 A1* | 5/2009 | Hirose et al. ................... | 361/502 |
| 2010/0296226 A1* | 11/2010 | Nanba et al. ................... | 361/502 |
| 2011/0170236 A1* | 7/2011 | Young ............................ | 361/502 |

(Continued)

FOREIGN PATENT DOCUMENTS

| | | |
|---|---|---|
| JP | 03-139815 A | 6/1991 |
| JP | 2005-079505 A | 3/2005 |
| JP | 2005-353568 A | 12/2005 |
| JP | 3924273 B2 | 6/2007 |
| JP | 2008-010613 A | 1/2008 |

(Continued)

OTHER PUBLICATIONS

Machine Translation for previously submitted JP 2008-010613.*

*Primary Examiner* — Dion R Ferguson

(74) *Attorney, Agent, or Firm* — Drinker Biddle & Reath LLP

(57) ABSTRACT

An electrode for an electric storage device includes at least an active material selected from the group consisting of a carbon nanotube, activated carbon, hard carbon, graphite, graphene and a carbon nanohorn; an ionic liquid; and a three-dimensional network metal porous body.

14 Claims, 8 Drawing Sheets

(51) Int. Cl.
*H01G 11/24* (2013.01)
*H01G 11/36* (2013.01)
*H01G 11/70* (2013.01)
*B82Y 99/00* (2011.01)
*B82Y 30/00* (2011.01)

(52) U.S. Cl.
CPC ............... *H01G 11/36* (2013.01); *H01G 11/34* (2013.01); *H01G 11/70* (2013.01); *B82Y 30/00* (2013.01); *Y02E 60/13* (2013.01)

(56) References Cited

U.S. PATENT DOCUMENTS

2011/0242731 A1* 10/2011 Fleischer et al. .............. 361/502
2012/0154982 A1* 6/2012 Ota et al. ...................... 361/502

FOREIGN PATENT DOCUMENTS

| JP | 2009-267340 A | 11/2009 |
| WO | WO 2007/013693 A2 | 2/2007 |

* cited by examiner (A)

(B)

ELECTRODE FOR ELECTRIC STORAGE DEVICE, ELECTRIC STORAGE DEVICE AND MANUFACTURING METHOD OF ELECTRODE FOR ELECTRIC STORAGE DEVICE

This application claims the benefit of U.S. Provisional Application No. 61/652,989 filed May 30, 2012.

BACKGROUND OF THE INVENTION

1. Field of the Invention

The present invention relates to an electrode for an electric storage device, an electric storage device and a manufacturing method of an electrode for an electric storage device.

2. Description of the Background Art

A capacitor of electric storage devices is widely used in various electric equipments and the like. Among many types of capacitors, an electric double layer capacitor and a lithium-ion capacitor have a large capacity and particularly receive attention during recent years.

An electric double layer capacitor is an electric storage device including a cell, a hermetically sealed case for securing electrical insulation between cells and for preventing liquid leakage, a current collecting electrode for externally drawing electricity, and a lead wire. The cell principally includes a pair of opposed activated carbon electrodes, a separator for electrically isolating the electrodes from each other, and an organic electrolytic solution for developing a capacity.

Further, a lithium-ion capacitor is an electric storage device that uses an electrode capable of electrostatically adsorbing/desorbing ions, such as an activated carbon electrode, for a positive electrode, and uses an electrode capable of occluding lithium ions, such as hard carbon, for a negative electrode.

Energy stored in an electric double layer capacitor is expressed by the following equation (1):

$$W = (1/2)CU^2 \quad (1)$$

wherein, W represents energy (capacity) stored, C represents a capacitance (depending on a surface area of an electrode), and U represents a cell voltage, respectively.

It is considered from the equation (1) that an improvement in capacitance contributes to an improvement in the energy to be stored.

In order to improve a capacitance in an electric double layer capacitor, Japanese Patent No. 3924273 (Japanese Patent Laying-Open No. 2005-079505) discloses "An electrode material of an electric double layer capacitor, which is made of a gel-like composition composed of an ionic liquid and a carbon nanotube obtained by applying shear force to the carbon nanotube in the presence of an ionic liquid for subdivision".

Japanese Patent Laying-Open No. 2009-267340 discloses "An electrode for an electric double layer capacitor, wherein a sheet obtained by molding a carbon nanotube having a specific surface area of 600 to 2600 m²/g into a sheet is integrated with a base material constituting a current collector and having projections and depressions at the surface by the projections and depressions".

SUMMARY OF THE INVENTION

However, the gel-like composition of Japanese Patent No. 3924273 has a disadvantage in handling as an electrode material since the composition is easily deformed and is not solidified. Furthermore, the composition also has a problem in increasing a capacitance per a unit area of an electrode since it is difficult to attach the gel-like composition onto a current collecting foil in a large thickness.

Also, Japanese Patent Laying-Open No. 2009-267340 describes a technology in which a nickel foam (three-dimensional network nickel porous body) is used as a base material, but there is a problem that the carbon nanotubes are hardly dispersed uniformly relative to the base material having projections and depressions. Furthermore, there is a problem of generation of a gas such as CO resulting from remaining water and functional groups in the activated carbon, resulting in difficulty in increasing a cell voltage. Further, it has been desired to increase power in relation to the ability of contact between the electrode material and the current collector.

The present invention has been made in view of the prior art, and it is an object of the present invention to provide an electrode for an electric storage device that can improve a capacitance and a cell voltage to improve an energy density to be stored when the electrode is used as an electrode of an electric storage device, an electric storage device using the electrode for an electric storage device, and a manufacturing method of the electrode for an electric storage device.

The present invention relates to an electrode for an electric storage device including at least an active material selected from the group consisting of a carbon nanotube, activated carbon, hard carbon, graphite, graphene and a carbon nanohorn; an ionic liquid; and a three-dimensional network metal porous body.

When the electrode for an electric storage device of the present invention is used as an electrode of an electric storage device, it can improve a capacitance and a cell voltage of the electric storage device to improve an energy density to be stored.

In the electrode for an electric storage device of the present invention, the active material preferably contains a carbon nanotube.

In the electrode for an electric storage device of the present invention, the active material is preferably a carbon nanotube.

When the active material contains a carbon nanotube, the ability of contact between the active materials is improved since the carbon nanotube is fibrous, leading to an improvement in an electric conducting property. Therefore, when the electrode for an electric storage device using a carbon nanotube as an active material is used as an electrode of an electric storage device, power of the electric storage device can be improved.

In the electrode for an electric storage device of the present invention, a metal of the three-dimensional network metal porous body preferably contains at least one selected from the group consisting of aluminum, nickel, copper, an aluminum alloy and a nickel alloy.

In the electrode for an electric storage device of the present invention, the metal of the three-dimensional network metal porous body is preferably aluminum.

The electrode for an electric storage device using aluminum, nickel, copper, an aluminum alloy or a nickel alloy as the metal of the three-dimensional network metal porous body can provide an electric storage device capable of charging stably even in a long-term charging and discharging since the electrode for an electric storage device is hardly eluted in a range of working voltage (about 0 V or more and 5 V or less relative to a lithium potential) of the electric storage device. Particularly in a rage of a high voltage (3.5 V or more relative to a lithium potential), the metal of the three-dimensional network metal porous body preferably contains aluminum, an aluminum alloy or a nickel alloy, and particularly, the metal of the three-dimensional network metal porous body more preferably contains aluminum.

In the electrode for an electric storage device of the present invention, preferably, the electrode for an electric storage device does not contain a binder component.

In accordance with the electrode for an electric storage device of the present invention, the active material can be held in the pores of the three-dimensional network metal porous body. Therefore, the electrode can be prepared without using a binder component as an insulating material. Accordingly, since the active material can be loaded into an electrode unit volume of the electrode for an electric storage device of the present invention at a high level of the content and internal resistance is reduced, it can improve a capacitance and a cell voltage of the electric storage device to improve an energy density to be stored.

In the electrode for an electric storage device of the present invention, the ionic liquid preferably contains an organic solvent.

When the ionic liquid contains an organic solvent, the viscosity of the ionic liquid is reduced. Therefore, the electrode for an electric storage device of the present invention can improve low-temperature characteristics of the electric storage device.

In the electrode for an electric storage device of the present invention, the carbon nanotube preferably has a shape in which both ends of the carbon nanotube are opened.

When both ends of the carbon nanotube are opened, since the ionic liquid or the electrolytic solution easily penetrates into the inside of the carbon nanotube, a contact area between the carbon nanotube and the ionic liquid or the electrolytic solution is increased. Therefore, the electrode for an electric storage device of the present invention can increase a capacitance of the electric storage device.

In the electrode for an electric storage device of the present invention, the carbon nanotubes preferably have an average length in a range of 100 nm or more and 2000 µm or less. The carbon nanotubes more preferably have an average length in a range of 500 nm or more and 100 µm or less.

When the carbon nanotubes have an average length in a range of 100 nm or more and 2000 µm or less, and more preferably in a range of 500 nm or more and 100 µm or less, dispersibility of the carbon nanotubes in the ionic liquid is good, and the carbon nanotube is easily held in the pore of the three-dimensional network metal porous body. Therefore, a contact area between the carbon nanotube and the ionic liquid can be increased, leading to an increase in capacitance of the electric storage device.

In the electrode for an electric storage device of the present invention, the carbon nanotubes preferably have an average diameter in a range of 0.1 nm or more and 50 nm or less.

When the carbon nanotubes have an average diameter in a range of 0.1 nm or more and 50 nm or less, since the ionic liquid or the electrolytic solution easily penetrates into the inside of the carbon nanotube, a contact area between the carbon nanotube and the ionic liquid or the electrolytic solution is increased. Therefore, the electrode for an electric storage device of the present invention can increase a capacitance of the electric storage device.

In the electrode for an electric storage device of the present invention, the carbon nanotube preferably has a purity of 70% by mass or more, and more preferably 90% by mass or more. When the carbon nanotube has a purity of less than 70% by mass, there are fears of reduction of a withstand voltage and generation of dendrite due to influence of a catalyst metal.

When the carbon nanotube has a purity of 90% by mass or more, an electric conducting property is good. Therefore, the electrode for an electric storage device of the present invention can improve a power of the electric storage device.

In the electrode for an electric storage device of the present invention, the three-dimensional network metal porous body preferably has an average pore diameter of 50 µm or more and 1000 µm or less.

When the three-dimensional network metal porous body has an average pore diameter of 50 µm or more, the active material and the ionic liquid easily enter the pores of the three-dimensional network metal porous body, and therefore the ability of contact between the active material and the three-dimensional network metal porous body is improved. Accordingly, internal resistance of the electrode is reduced and an energy density of the electric storage device can be improved. On the other hand, when the three-dimensional network metal porous body has an average pore diameter of 1000 µm or less, the active material can be held well in the pore even without using a binder component, and further a capacitor having sufficient strength can be obtained.

The present invention relates to an electric storage device including the electrode for an electric storage device.

In accordance with the electric storage device of the present invention, a capacitance and a cell voltage can be improved, and an energy density to be stored can be improved.

In the electric storage device of the present invention, the electric storage device is preferably an electric double layer capacitor or a lithium-ion capacitor.

When the electrode for an electric storage device of the present invention is used as an electrode of an electric double layer capacitor or a lithium-ion capacitor, a capacitance and a cell voltage of the capacitor can be improved, and an energy density to be stored can be improved.

The present invention relates to a manufacturing method of an electrode for an electric storage device including the steps of kneading at least one active material selected from the group consisting of a carbon nanotube, activated carbon, hard carbon, graphite, graphene and a carbon nanohorn with an ionic liquid to produce a kneaded substance; and allowing the kneaded substance to be contained in a three-dimensional network metal porous body.

In accordance with the present invention, it is possible to obtain an electrode for an electric storage device in which the kneaded substance containing a carbon nanotube and an ionic liquid is contained in the pores of the three-dimensional network metal porous body. When the electrode for an electric storage device is used as an electrode of an electric storage device, it can improve a capacitance and a cell voltage of the electric storage device to improve an energy density to be stored.

In accordance with the present invention, it is possible to provide an electrode for an electric storage device that can improve a capacitance and a cell voltage to improve an energy density to be stored when the electrode is used as an electrode of an electric storage device, an electric storage device using the electrode for an electric storage device, and a manufacturing method of the electrode for an electric storage device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
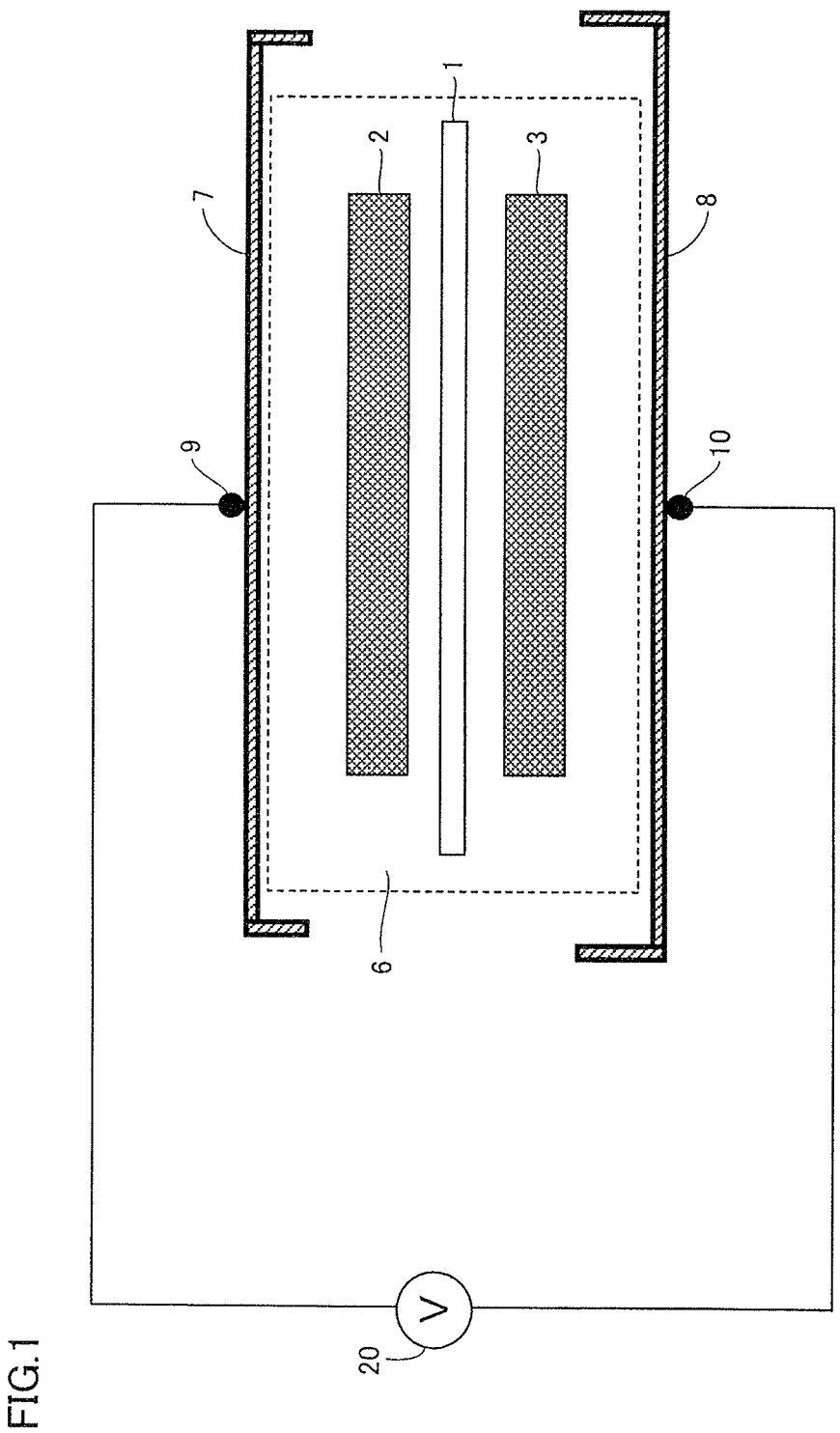
FIG. 1 is a schematic view of a cell of an electric double layer capacitor in one embodiment of the present invention.

Hereinafter, the present invention will be described based on embodiments. However, the present invention is not limited to the following embodiments. Various modifications to the following embodiments may be made within the scope of identification and equivalence of the present invention.

[Embodiment 1]
(Electrode for Electric Storage Device)

In one embodiment of the present invention, an electrode for an electric storage device includes at least an active material selected from the group consisting of a carbon nanotube, activated carbon, hard carbon, graphite, graphene and a carbon nanohorn; an ionic liquid; and a three-dimensional network metal porous body.

(Active Material)

As the active material, at least one selected from the group consisting of a carbon nanotube, activated carbon, hard carbon, graphite, graphene and a carbon nanohorn can be used.

As the carbon nanotube, for example, a singlewall carbon nanotube (hereinafter, also referred to as a singlewall CNT) in which only one layer (graphene) of carbon is rolled into a tube, a doublewall carbon nanotube (hereinafter, also referred to as a doublewall CNT) in which a layer having a plurality of carbon layers laminated is rolled into a tube or a multiwall carbon nanotube (hereinafter, also referred to as a multiwall CNT), a cup-stacked nanotube having a structure in which graphenes in the shape of a bottomless paper cup are laminated, and the like are known.

The form of the carbon nanotube is not particularly limited, and any of a carbon nanotube having a closed tip and a carbon nanotube having an opened tip can be used. Particularly, a carbon nanotube having a form in which both ends of the carbon nanotube are opened is preferably used. When both ends of the carbon nanotube are opened, since the ionic liquid or the electrolytic solution easily penetrates into the inside of the carbon nanotube, a contact area between the carbon nanotube and the ionic liquid or the electrolytic solution is increased. Therefore, the electrode for an electric storage device using the carbon nanotube can increase a capacitance of the electric storage device.

The carbon nanotubes preferably have an average length in a range of 100 nm or more and 2000 µm or less, and more preferably in a range of 500 nm or more and 100 µm or less. When the carbon nanotubes have an average length in a range of 100 nm or more and 2000 µm or less, dispersibility of the carbon nanotubes in the ionic liquid is good, and the carbon nanotube is easily held in the pore of the three-dimensional network metal porous body. Therefore, a contact area between the carbon nanotube and the ionic liquid can be increased, leading to an increase in capacitance of an electric storage device. Moreover, when the carbon nanotubes have an average length of 500 nm or more and 100 µm or less, the effect of increasing the capacitance of an electric storage device is remarkable.

The carbon nanotubes preferably have an average diameter in a range of 0.1 nm or more and 50 nm or less, and more preferably in a range of 0.5 nm or more and 5 nm or less. When the carbon nanotubes have an average diameter in a range of 0.1 nm or more and 50 nm or less, since the ionic liquid or the electrolytic solution easily penetrates into the inside of the carbon nanotube, a contact area between the carbon nanotube and the ionic liquid or the electrolytic solution can be increased, leading to an increase in capacitance of an electric storage device.

The carbon nanotube preferably has a purity of 70% by mass or more, and more preferably 90% by mass or more. When the carbon nanotube has a purity of less than 70% by mass, there are fears of deterioration of a withstand voltage and generation of dendrite due to influence of a catalyst metal.

When the carbon nanotube has a purity of 90% by mass or more, an electric conducting property is good. Therefore, the electrode for an electric storage device prepared by using the carbon nanotube can improve a power of the electric storage device.

As the activated carbon, those generally commercially available for an electric storage device can be employed. Examples of a raw material of the activated carbon include lumbers, palm shells, pulp spent liquors, coals, petroleum heavy oils, coal/petroleum pitches obtained by thermally decomposing coal/petroleum, and resins such as a phenolic resin and the like. The activated carbon is generally activated after carbonization, and examples of an activation method include a gas activation method and a chemical activation method. The gas activation method is a method in which activated carbon is obtained by contact reaction with steam, carbon dioxide, oxygen or the like at elevated temperatures. The chemical activation method is a method in which activated carbon is obtained by impregnating the above-mentioned material with a publicly known activation chemical, and heating the material in an atmosphere of inert gas to cause dehydration and an oxidation reaction of the activation chemical. Examples of the activation chemical include zinc chloride, sodium hydroxide and the like.

A particle diameter of the activated carbon is not particularly limited, but it is preferably, for example, 20 µm or less. A specific surface area thereof is not also particularly limited, but it is preferably, for example, 2000 $m^2/g$ or more since when the activated carbon has a larger surface area, the electric storage device has a larger capacitance.

As the hard carbon, graphite and graphene, those commonly used as an electrode material can be used.

The carbon nanohorn (hereinafter, also referred to as a CNH) is one having a shape in which graphene is rolled into a circular cone, a diameter of a bottom surface is about 2 nm or more and 10 nm or less, and a height of the cone is about 10 nm or more and 5 μm or less. Since the CNH has a large specific surface area, an electrode using the CNH can increase a capacitance of an electric storage device. Further, since the CNH does not use a metal catalyst in manufacture, it has a very high purity and a good electric conducting property. Therefore, an electrode using the CNH can improve a power of an electric storage device.

Both of the CNH and the carbon nanotube can be used as an active material. Since the CNH is smaller in length than the carbon nanotube, the CNH is considered to enter the space between the carbon nanotubes when mixing the CNH and the carbon nanotube. Therefore, when a three-dimensional network metal porous body including the CNH and the carbon nanotube is compressed in the step of preparing an electrode, the content of the active material in the three-dimensional network metal porous body can be can be increased.

(Ionic Liquid)

The ionic liquid is a liquid formed by combining an anion with a cation so as to have a melting point of about 100° C. or less. For example, as the anion, hexafluorophosphate ($PF_6$), tetrafluoroborate ($BF_4$), bis(trifluoromethanesulfonyl)imide (TFSI), trifluoromethanesulfonate (TFS) or bis(perfluoroethylsulfonyl)imide (BETI) can be used. As the cation, an imidazolium ion having an alkyl group having 1 to 8 carbon atoms, a pyridinium ion having an alkyl group having 1 to 8 carbon atoms, a piperidinium ion having an alkyl group having 1 to 8 carbon atoms, a pyrrolidinium ion having an alkyl group having 1 to 8 carbon atoms or a sulfonium ion having an alkyl group having 1 to 8 carbon atoms can be used.

As the ionic liquid, for example, 1-ethyl-3-methylimidazolium-tetrafluoroborate (EMI-$BF_4$), 1-ethyl-3-methylimidazolium-bis(fluorosulfonyl)imide (EMI-FSI), 1-ethyl-3-methylimidazolium-bis(trifluoromethanesulfonyl)imide (EMI-TFSI), 1-butyl-3-methylimidazolium-bis(trifluoromethanesulfonyl)imide (BMI-TFSI), 1-hexyl-3-methylimidazolium-tetrafluoroborate (HMI-$BF_4$), 1-hexyl-3-methylimidazolium-bis(trifluoromethanesulfonyl)imide (HMI-TFSI), 1-ethyl-3-methylimidazolium-fluorohydrogenate (EMI$(FH)_{2.3}$F), N,N-diethyl-N-methyl-N-(2-methoxyethyl)-tetrafluoroborate (DEME-$BF_4$), N,N-diethyl-N-methyl-N-(2-methoxyethyl)-bis(trifluoromethanesulfonyl) imide (DEME-TFSI), N-methyl-N-propylpiperidinium-bis (trifluoromethanesulfonyl)imide (PP13-TFSI), triethylsulfonium-bis(trifluoromethanesulfonyl)imide (TES-TFSI), N-methyl-N-propylpyrrolidinium-bis(trifluoromethanesulfonyl)imide (P13-TFSI), triethyloctylphosphonium-bis(trifluoromethanesulfonyl)imide (P2228-TFSI), and N-methyl-methoxymethylpyrrolidinium-tetrafluoroborate (C13-$BF_4$) can be used. Further, these ionic liquids may be used singly, or may be used appropriately in combination. Moreover, the ionic liquid may contain a supporting salt.

When the electrode for an electric storage device is used for a lithium-ion capacitor, an ionic liquid containing a lithium salt such as lithium-bis(fluorosulfonyl)imide (LiFSI) or lithium-bis(trifluoromethanesulfonyl)imide (LiTFSI) is used as the ionic liquid.

When the electrode for an electric storage device is used for the lithium-ion capacitor, a solution in which the supporting salt is dissolved in the ionic liquid is used.

As the supporting salt, for example, lithium-hexafluorophosphate ($LiPF_6$), lithium-tetrafluoroborate ($LiBF_4$), lithium-perchlorate ($LiClO_4$), lithium-bis(trifluoromethanesulfonyl)imide ($LiN(SO_2CF_3)_2$), lithium-bis(pentafluoroethanesulfonyl)imide ($LiN(SO_2C_2F_5)_2$), lithium-bis(pentafluoroethanesulfonyl)imide (LiBETI), lithium-trifluoromethanesulfonate ($LiCF_3SO_3$), lithium-bis(oxalate) borate ($LiBC_4O_8$), or the like can be used.

A concentration of the supporting salt in the ionic liquid is preferably 0.1 mol/L or more and 5.0 mol/L or less, and more preferably 1 mol/L or more and 3.0 mol/L or less.

The ionic liquid can contain an organic solvent. When the ionic liquid contains an organic solvent, the viscosity of the ionic liquid is reduced. Therefore, the electrode for an electric storage device of the present invention can improve low-temperature characteristics of the electric storage device.

As the organic solvent, for example, propylene carbonate (PC), dimethyl carbonate (DMC), diethyl carbonate (DEC), ethylmethyl carbonate (EMC), γ-butyrolactone (GBL), acetonitrile (AN) and the like may be used singly or in combination.

(Three-Dimensional Network Metal Porous Body)

The three-dimensional network metal porous body plays a role of a current collector in the electrode for an electric storage device.

The three-dimensional network metal porous body has a three-dimensional network structure in which a porous shape is continued. For example, a metal nonwoven fabric in which fibrous metals are tangled with one another, a metal foam obtained by foaming metal, Celmet (registered trademark) (manufactured by Sumitomo Electric Industries, Ltd.) prepared by forming a metal layer on the surface of a resin foam and then decomposing the resin foam, and the like can be used.

It is preferred to use aluminum, nickel, copper, an aluminum alloy or a nickel alloy as the metal of the three-dimensional network metal porous body. These metals or metal alloys can provide an electric storage device capable of charging stably even in a long-term charging and discharging since the electrode for an electric storage device is hardly eluted in a range of working voltage (about 0 V or more and 5 V or less relative to a lithium potential) of the electric storage device. Particularly in a rage of a high voltage (3.5 V or more relative to a lithium potential), the metal of the three-dimensional network metal porous body preferably contains aluminum, an aluminum alloy or a nickel alloy, and particularly, the metal of the three-dimensional network metal porous body more preferably contains aluminum.

The three-dimensional network metal porous body preferably has an average pore diameter of 50 μm or more and 1000 μm or less. When the three-dimensional network metal porous body has an average pore diameter of 50 μm or more, the active material and the ionic liquid easily enter the pores of the three-dimensional network metal porous body, and therefore the ability of contact between the active material and the three-dimensional network metal porous body is improved. Accordingly, internal resistance of the electrode is reduced and an energy density of the electric storage device can be improved. On the other hand, when the three-dimensional network metal porous body has an average pore diameter of 1000 μm or less, the active material can be held well in the pore even without using a binder component, and further a capacitor having sufficient strength can be obtained. The three-dimensional network metal porous body more preferably has an average pore diameter of 400 μm or more and 900 μm or less, and particularly preferably 450 μm or more and 850 μm or less.

In addition, the average pore diameter of the three-dimensional network metal porous body can be checked by shaving a surface of the electrode for an electric storage device to such an extent that a skeleton of the metal porous body can be observed, and observing a pore diameter of the metal porous body exposed to the surface with a microscope.

A weight per a unit area of the three-dimensional network metal porous body is preferably 500 g/m² or less from the viewpoint of strength as an electrode for an electric storage device and reduction in electric resistance of an electric storage device. Furthermore, the weight per a unit area is preferably 150 g/m² or less from the viewpoint of improving an energy density of an electric storage device.

A porosity that is a ratio of a volume of an inner space of the three-dimensional network metal porous body is not particularly limited, but it is preferably from about 80% to about 98%.

(Binder)

A role of a binder is to bind an active material to a current collector in the electrode. However, since a binder resin typified by polyvinylidene fluoride (PVdF) is an insulating material, the binder resin itself becomes a factor in increasing internal resistance of the electric storage device including the electrode, and becomes a factor in deteriorating charge-discharge efficiency of the electric storage device.

In accordance with the electrode for an electric storage device of the present invention, the active material can be held in the pores of the three-dimensional network metal porous body that is a current collector even without using a binder. Accordingly, in one embodiment of the present invention, the electrode for an electric storage device does not preferably contain a binder.

In addition, in other embodiments of the present invention, a binder may be used in the electrode for an electric storage device. As the binder, for example, a polyvinylidene fluoride-hexafluoropropylene copolymer (PVdF-HFP), a polyethyleneoxide modified polymethacrylate crosslinked product (PEO-PMA), polyethylene oxide (PEO), a polyethylene glycol diacrylate crosslinked product (PEO-PA), polyacrylonitrile (PAN), polymethylmethacrylate (PMMA), polyvinyl alcohol (PVA), polyvinyl pyrrolidone (PVP), polyacrylic acid (PAA), polyvinyl acetate, pyridinium-1,4-diyliminocarbonyl-1,4-phenylenemethylene (PICPM)-$BF_4$, PICPM-$PF_6$, PICPM-TFSA, PICPM-SCN, PICPM-OTf or the like can be used. Particularly, a polyvinylidene fluoride-hexafluoropropylene copolymer (PVdF-HFP), polymethylmethacrylate (PMMA), or a polyethyleneoxide modified polymethacrylate crosslinked product (PEO-PMA) is preferably used.

(Conductive Aid)

The electrode for an electric storage device may include a conductive aid. The conductive aid can reduce resistance of an electric storage device. The type of the conductive aid is not particularly limited, and for example, acetylene black, Ketjen black, carbon fiber, natural graphite (flake graphite, amorphous graphite, etc), synthetic graphite, ruthenium oxide and the like can be used. The content of the conductive aid is preferably, for example, 2 parts by mass or more and 20 parts by mass or less with respect to 100 parts by mass of the active material. When the content of the conductive aid is less than 2 parts by mass, the effect of improving conductivity is small, and when the content of the conductive aid is more than 20 parts by mass, the capacitance may be deteriorated.

(Manufacturing Method of Electrode for Electric Storage Device)

A manufacturing method of an electrode for an electric storage device in one embodiment of the present invention will be described below.

First, an active material and an ionic liquid are kneaded to obtain a kneaded substance. For example, by kneading the active material and the ionic liquid for 10 minutes or more to about 120 minutes by use of a mortar, a kneaded substance in which the active material is uniformly dispersed in the ionic liquid can be obtained. When the active material is dispersed in the ionic liquid, agglomeration between nanocarbon-based active materials is dissolved and a specific surface area of the active material is increased. Accordingly, when an electrode is prepared by using the kneaded substance, a larger capacitance can be attained.

A kneading ratio between the active material and the ionic liquid is not particularly limited, but for example, when an amount of the active material in the kneaded substance is in a range of 3% by mass to 70% by mass of the total amount of the kneaded substance, the active material is easily contained in the three-dimensional network metal porous body, and therefore it is preferred. In addition, when the supporting salt or the binder is added, it can be added in the kneading step.

Next, the kneaded substance is allowed to be contained in the three-dimensional network metal porous body. For example, the three-dimensional network metal porous body is placed on an air-pervious or liquid-pervious mesh or porous plate or membrane, and the kneaded substance is allowed to be contained in the metal porous body in a manner of rubbing the kneaded substance into the three-dimensional network metal porous body from a top surface of the metal porous body towards an under surface (a mesh plate setting side) by a squeegee or the like.

A thickness of the electrode can be adjusted by any of (1) a method of adjusting a thickness of the three-dimensional network metal porous body in advance and (2) a method of adjusting a thickness of the three-dimensional network metal porous body after allowing the kneaded substance to be contained in the three-dimensional network metal porous body.

In the above method (1), for example, a three-dimensional network metal porous body having a thickness of 300 μm or more and 3 mm or less is adjusted to an optimal thickness by roll press. For example, the thickness of the three-dimensional network metal porous body is preferably adjusted to 100 μm or more and 800 μm or less.

In the above method (2), for example, after the kneaded substance is allowed to be contained in the three-dimensional network metal porous body, an ionic-liquid absorbers are disposed on both surfaces of the three-dimensional network metal porous body, and then the three-dimensional network metal porous body is uniaxially rolled in a thickness direction by applying a pressure of about 30 MPa to 450 MPa. When rolling the three-dimensional network metal porous body, an excessive ionic liquid is drained out of the kneaded substance contained in the three-dimensional network metal porous body and absorbed in the ionic-liquid absorbers. Therefore, a concentration of the active material in the kneaded substance remaining in the three-dimensional network metal porous body is increased. Accordingly, a discharge capacity (mAh/cm²) per a unit area and a power (W/cm²) per a unit area of the electrode can be increased in an electric storage device using the electrode.

A thickness of the electrode is preferably in a range of 0.2 mm or more and 1.0 mm or less from the viewpoint of the discharge capacity per a unit area of the electrode. Also, the thickness of the electrode is preferably in a range of 0.05 mm or more and 0.5 mm or less from the viewpoint of the power per a unit area of the electrode.

Physical properties and a pore diameter of the ionic-liquid absorber are not particularly limited, but it is preferred that an absorber subjected to a hydrophilization treatment is used for a hydrophilic ionic liquid (e.g., EMI-$BF_4$, DEME-$BF_4$, C13-$BF_4$, etc.) and an absorber subjected to a hydrophobization treatment is used for a hydrophobic ionic liquid (e.g., EMI-FSI, EMI-TFSI, DEME-TFSI, PP-13-TFSI, P13-TFSI, P2228-TFSI, etc.).

[Embodiment 2]
(Electric Double Layer Capacitor)

An electric double layer capacitor using the electrode for an electric storage device of the present invention will be described with reference to FIG. 1.

In the electric double layer capacitor using the electrode for an electric storage device of the present invention, a positive electrode 2 and a negative electrode 3 are located with a separator 1 sandwiched therebetween. Separator 1, positive electrode 2 and negative electrode 3 are hermetically sealed in a space filled with an electrolytic solution 6 between an upper cell case 7 and a lower cell case 8, respectively. Terminals 9 and 10 are disposed in upper cell case 7 and lower cell case 8. Terminals 9 and 10 are connected to a power source 20.

In the electric double layer capacitor, the electrode for an electric storage device of the present invention can be used for the positive electrode and the negative electrode.

For the electrolytic solution, an ionic liquid to be used for the electrode for an electric storage device can be used.

As the separator of the electric double layer capacitor, a highly electrically insulating porous membrane made of, for example, polyolefin, polyethylene terephthalate, polyamide, polyimide, cellulose, glass fibers or the like, can be used.

(Manufacturing Method of Electric Double Layer Capacitor)

First, the electrode for an electric storage device of the present invention is punched out in an appropriate size to prepare two electrodes, and these electrodes are opposed to each other with a separator interposed therebetween. Then, the electrodes are housed in a cell case, and impregnated with an electrolytic solution. Finally, the case is capped and sealed, and thereby an electric double layer capacitor can be prepared. In order to decrease moisture in the capacitor as far as possible, the capacitor is prepared in low-moisture environments, and sealing of the case is performed under reduced pressure. The capacitor may be prepared by a method other than the above method as long as the electrode for an electric storage device of the present invention is used.

[Embodiment 3]
(Lithium-Ion Capacitor)

Figure 10:
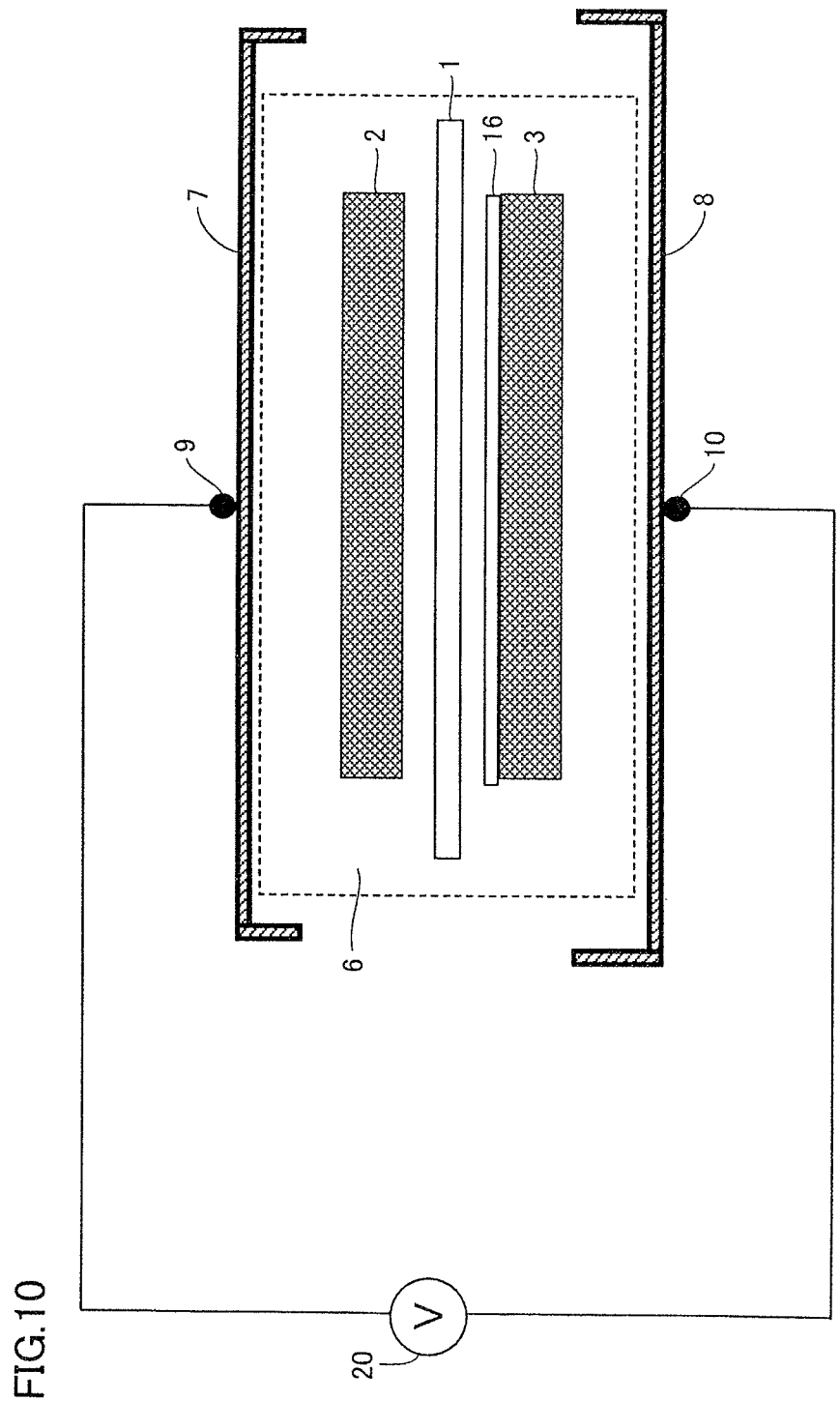
FIG. 10 is a schematic view of a cell of a lithium-ion capacitor in one embodiment of the present invention.

A lithium-ion capacitor using the electrode for an electric storage device of the present invention will be described with reference to FIG. 10.

A structure of the lithium-ion capacitor using the electrode for an electric storage device of the present invention is basically similar to that of the electric double layer capacitor except that a lithium metal foil 16 is attached to the surface of negative electrode 3 opposed to positive electrode 2 by pressure.

In the lithium-ion capacitor, the electrode for an electric storage device of the present invention can be used for the positive electrode and the negative electrode. Further, the negative electrode is not particularly limited, and a conventional negative electrode using a metal foil can be used.

For the electrolytic solution, an ionic liquid containing a lithium salt to be used for the electrode for an electric storage device is used.

A lithium metal foil for lithium doping is attached to the negative electrode by pressure.

In the lithium-ion capacitor, it is preferred that a negative electrode capacity is larger than a positive electrode capacity and an amount of lithium ions to be occluded by the negative electrode is 90% or less of a difference between the positive electrode capacity and the negative electrode capacity. The amount of lithium ions to be occluded can be adjusted by adjusting a thickness of the lithium metal foil to be attached the negative electrode by pressure.

(Manufacturing Method of Lithium-Ion Capacitor)

First, the electrode for an electric storage device of the present invention is punched out in an appropriate size to prepare a positive electrode and a negative electrode, and a lithium metal foil is attached to the negative electrode by pressure. Then, the positive electrode and the negative electrode are opposed with a separator interposed therebetween. At this time, the negative electrode is located in such a manner that a surface thereof to which the lithium metal foil is attached by pressure is opposed to the positive electrode. Then, the electrodes are housed in a cell case, and impregnated with an electrolytic solution. Finally, the case is capped and sealed, and thereby a lithium-ion capacitor can be prepared.

In addition, in order to dope the electrode with lithium ions, the lithium ion capacitor is left to stand at an environmental temperature of 0° C. to 60° C. for 0.5 hours to 100 hours with the electrolytic solution poured into the case. It can be determined that lithium-doping is completed from the fact that a difference in potential between the positive electrode and the negative electrode becomes equal to or below 2 V.

EXAMPLE 1

In the present examples, as an active material in an electric double layer capacitor using the electrode of the present invention, singlewall carbon nanotubes having different purities (Example 1-1: "SO-P" (purity: 98.3% by mass, shape: singlewall CNT, length: 1 to 5 μm, average diameter: 1.4 nm) manufactured by Meijo Nano Carbon Co., Ltd.; Example 1-2: "NC1100" (purity: 92.4% by mass, shape: singlewall CNT, average diameter: 2 nm) manufactured by Nanocyl; Example 1-3: (purity: 73.6% by mass, shape: singlewall CNT, average diameter: 2 nm); Example 1-4: (purity: 69.3% by mass, shape: singlewall CNT, average diameter: 2 nm)) were used, and the performances of the electric double layer capacitors were evaluated.

EXAMPLES 1-1, 1-2, 1-3, 1-4

(Preparation of Kneaded Substance)

A singlewall CNT and EMI-BF$_4$ were used and prepared so that an amount of the singlewall CNT was 7% by mass of the total mass of the singlewall CNT and the EMI-BF$_4$. Then, the singlewall CNT and the EMI-BF$_4$ were kneaded for 10 minutes by use of a mortar to obtain a kneaded substance.

(Preparation of Electrode for Electric Storage Device)

A three-dimensional network aluminum porous body (average pore diameter 550 μm, thickness 1.0 mm) was prepared and adjusted to have a thickness of 300 μm by roll press in advance. Then, the kneaded substance of each example was placed on a top surface of the three-dimensional network aluminum porous body a thickness of which was adjusted, and the kneaded substance was rubbed into the porous body by use of a squeegee.

(Preparation of Electric Double Layer Capacitor)

Two electrodes for an electric storage device of the present invention were punched out in the shape of a circle of 15 mm in diameter (electrode area 1.77 cm$^2$), and used for a positive electrode and a negative electrode, respectively. These electrodes were opposed with a separator made of cellulose fibers ("TF 4035" manufactured by NIPPON KODOSHI CORPORATION, thickness 35 μm) interposed therebetween, and housed in a R2032 type coin cell case. Next, EMI-BF$_4$ was poured into the coin cell case as an electrolytic solution, and then an end of the case was sealed to prepare a coin type electric double layer capacitor.

<Physical Property Evaluation Test>

A purity of the carbon nanotube was evaluated by using TG-DTA (TGA-60AH manufactured by SHIMADZU CORPORATION). Measurement was performed at a temperature raising rate of 5° C./minute in an air flow (flow rate: 50 L/minute), and the purity was calculated from a reduction in mass before and after measurement. Further, types and mass percentages of metal impurities contained in the carbon nanotube were evaluated with ICP-AES (ICPS-8100CL manufactured by SHIMADZU CORPORATION).

<Performance Evaluation Test>

The electric double layer capacitor was charged to 2.3 V at a constant current of 1 A/g (current amount per an active material mass contained in a single electrode) at an environmental temperature of 25° C., and then charging at a constant voltage of 2.3 V was performed for 5 minutes. Thereafter, a voltage retention was evaluated by opening a circuit, and measuring a voltage after 1 minute. Thereafter, the electric double layer capacitor was discharged to 0 V at a constant current of 1 A/g (current amount per an active material mass contained in a single electrode). Charge-discharge efficiency was evaluated by dividing the discharge capacity by the charge capacity. Results of evaluations are shown in Table 1. Furthermore, with respect to each example, relationships between a capacity and a voltage of the capacitor at the times of charge and discharge are shown in FIGS. 2 to 5.

TABLE 1

| | Purity of Carbon (% by mass) | Catalyst Residue (% by mass) ICP-AES | | | | | Voltage Maintenance Rate | Charge-Discharge Efficiency |
|---|---|---|---|---|---|---|---|---|
| | TGA | Ni | Fe | Ca | Mg | Zn | (%) | (%) |
| Example 1-1 | 98.3 | 0.19 | 0.003 | 0.001 | — | 0.003 | 99.2 | 95.9 |
| Example 1-2 | 92.4 | — | 0.037 | 0.39 | 0.17 | 0.034 | 98.1 | 92.1 |
| Example 1-3 | 73.6 | 21 | 0.012 | 0.004 | 0.001 | 0.003 | 96.5 | 91.4 |
| Example 1-4 | 69.3 | 11 | 0.011 | 0.002 | 0.002 | 0.003 | 91.5 | 60.5 |

<Result of Evaluation>

Figure 2:
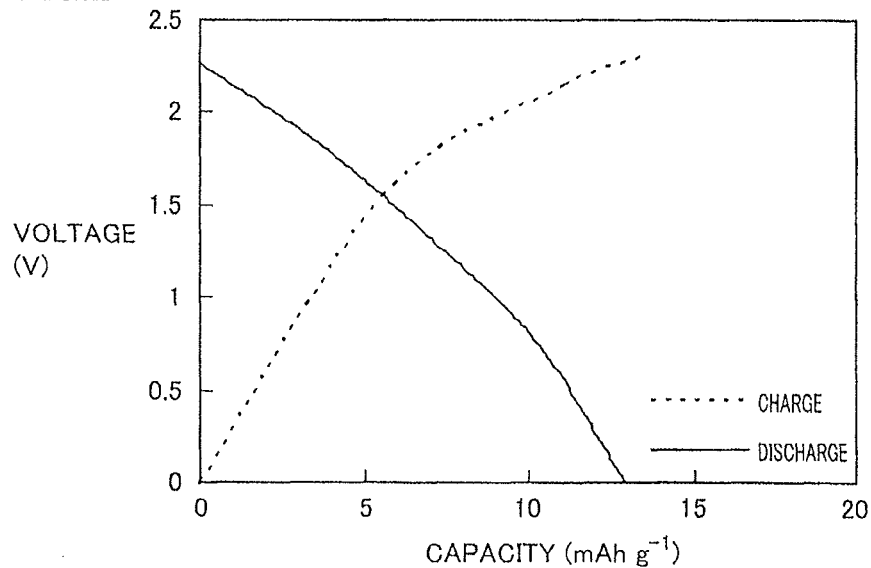
FIG. 2 is a graph showing relationships between a capacity and a voltage of the electric double layer capacitor at the times of charge and discharge of Example 1-1.
Figure 3:
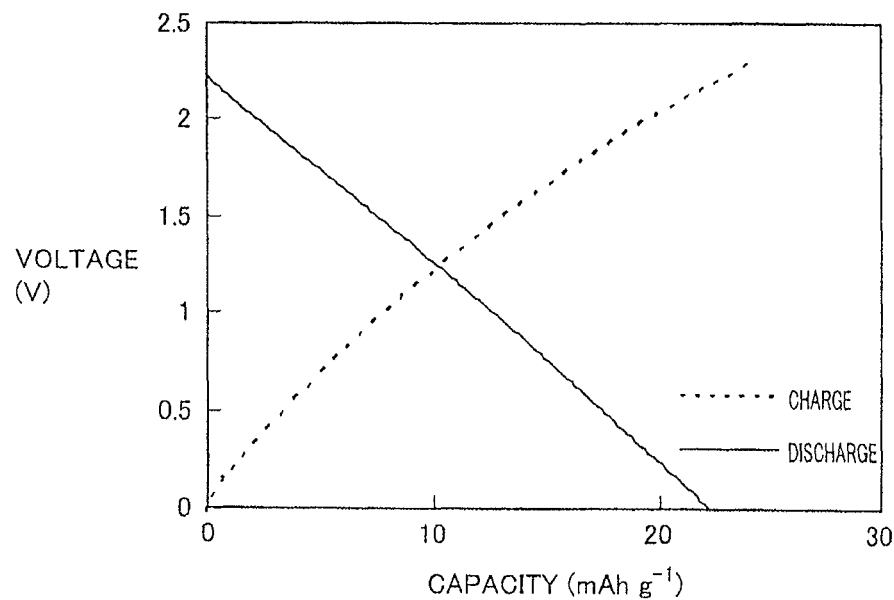
FIG. 3 is a graph showing relationships between a capacity and a voltage of the electric double layer capacitor at the times of charge and discharge of Example 1-2.
Figure 4:
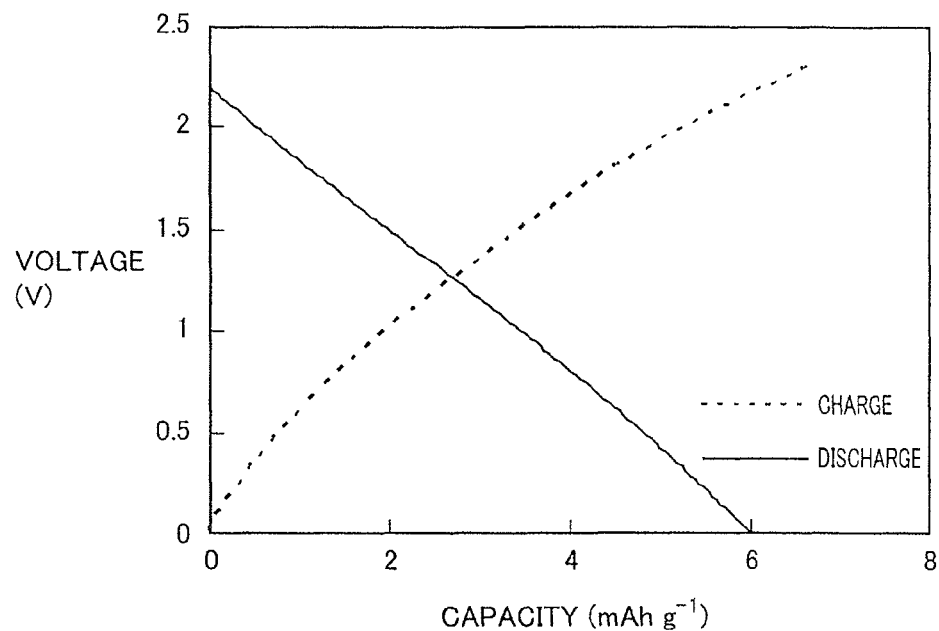
FIG. 4 is a graph showing relationships between a capacity and a voltage of the electric double layer capacitor at the times of charge and discharge of Example 1-3.
Figure 5:
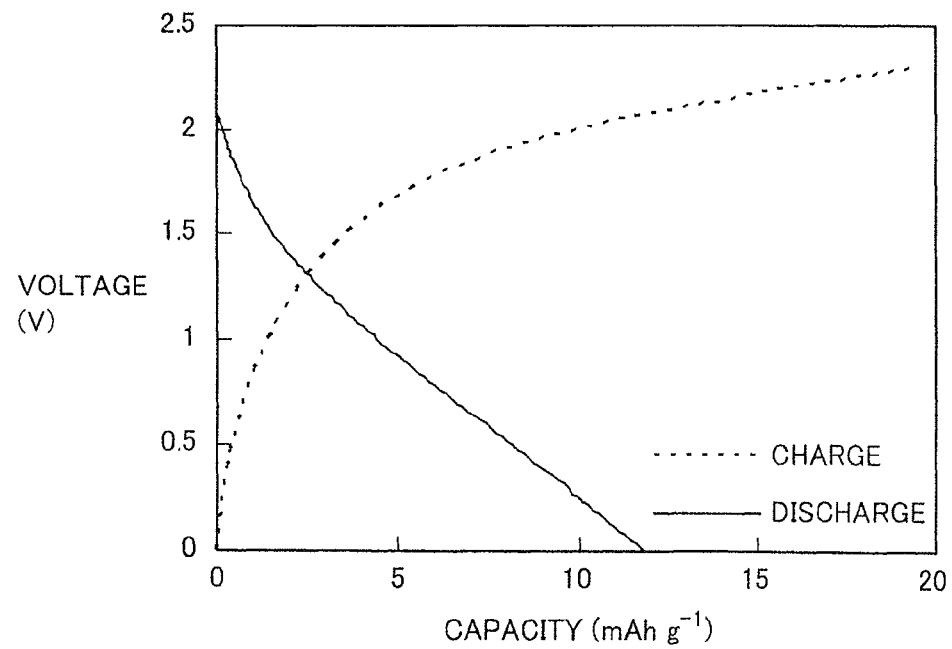
FIG. 5 is a graph showing relationships between a capacity and a voltage of the electric double layer capacitor at the times of charge and discharge of Example 1-4.

In Examples 1-1, 1-2, a purity of carbon of the singlewall CNT is as high as 90% by mass. Charge-discharge efficiency and a voltage retention of the capacitor prepared by use of these CNTs are high as shown in Table 1. On the other hand, the singlewall CNTs shown in Examples 1-3 and 1-4 contain metal impurities remaining in samples, such as Ni, Ca, Mg, Fe, Zn and the like, and have a low purity as compared with Examples 1-1 and 1-2. As a reason why the charge-discharge efficiency and the voltage retention of Examples 1-3 and 1-4 were lower than those of Examples 1-1 and 1-2, it is conceivable that stored charges were consumed by an electrochemical reaction of the metal impurities. These metal elements such as Ni, Ca, Mg, Fe, Zn and the like can become dendrites where metal is precipitated in the shape of a needle on the electrode by the electrochemical reaction. The occurrence of the dendrite may cause an electric short circuit of the capacitor. It was verified that when the carbon nanotube has a purity of 70% by mass or more, the electric double layer capacitor is stably operated as shown in FIGS. 2 to 4. However, the singlewall carbon nanotube more preferably has a purity of 90% by mass or more from the viewpoint of the charge-discharge efficiency, the voltage retention and the risk of the occurrence of dendrite.

EXAMPLE 2

In the present examples, in an electric double layer capacitor using the electrode of the present invention, the performances of the electric double layer capacitors in the case of varying the content of an active material in a single electrode through varying the content of an active material (singlewall CNT) in a kneaded substance were evaluated (Examples 2-1 to 2-3). Further, the performance of an electric double layer capacitor using an activated carbon sheet electrode was evaluated as a comparative example (Comparative Example 1). Furthermore, the performance of an electric double layer capacitor in the case of using activated carbon as an active material was evaluated (Comparative Example 2).

EXAMPLES 2-1 to 2-3

(Preparation of Kneaded Substance)

A singlewall CNT and EMI-BF$_4$ were prepared so that an amount of the singlewall CNT was 7% by mass (Example 2-1), 17% by mass (Example 2-2) and 27% by mass (Example 2-3), respectively, of the total amount of the singlewall CNT and the EMI-BF$_4$. Then, the singlewall CNT and the EMI-BF$_4$ were kneaded for 10 minutes by use of a mortar to obtain a kneaded substance.

(Preparation of Electrode for Electric Storage Device)

Electrodes were prepared in the same manner as in Example 1 except for using the above-mentioned kneaded substances having different percentages by mass.

(Preparation of Electric Double Layer Capacitor)

In each example, a coin (R2032) type electric double layer capacitor was obtained in the same manner as in Example 1.

<Performance Evaluation Test>

The capacitor was charged to 3.5 V at a constant current of 1 A/g (current amount per an active material mass contained in a single electrode) at an environmental temperature of 25° C., and then charging at a constant voltage of 3.5 V was performed for 5 minutes. Thereafter, the capacitor was discharged to 0 V at a constant current of 1 A/g (current amount per an active material mass contained in a single electrode), and a capacitance at this time was evaluated. In Table 2, the capacitance (F/g) was shown in terms of a capacitance per an active material mass contained in a single electrode. Further, the energy density $W_D$ (Wh/L) at this time was shown together. In addition, the energy density was calculated by use of the following equation (2):

$$W_D = W/V \qquad (2)$$

wherein, W represents energy stored in a capacitor, and V represents a volume. In addition, a volume V is a capacitor volume without including a coin cell case.

Results of evaluations are shown in Table 2.

COMPARATIVE EXAMPLE 1

(Preparation of Electrode)

Activated carbon (surface area: approximately 2000 m²/g) derived from a coconut husk, carbon black (conductive aid component, CB) and polytetrafluoroethylene (binder component, PTFE) were mixed in proportions of 80% by mass, 10% by mass, and 10% by mass, respectively, and then the resulting mixture was rolled to obtain an activated carbon sheet electrode having a thickness of 0.18 mm.

(Preparation of Electric Double Layer Capacitor)

Two electrodes were punched out in the shape of a circle of 15 mm in diameter, and an aluminum current collecting foil having a thickness of 50 μm was attached to one surface of each of the electrodes and then a coin (R2032) type electric double layer capacitor was obtained in the same manner as in Example 1. In addition, as an electrolytic solution, a solution obtained by dissolving a triethylmethylammonium-tetrafluoroborate (TEMA-BF$_4$) salt in propylene carbonate (PC) so as to have a concentration of 1.0 mol/L was used.

<Performance Evaluation Test>

The capacitor was charged to 2.3 V at a constant current of 1 A/g (current amount per an active material mass contained in a single electrode) at an environmental temperature of 25° C., and then charging at a constant voltage of 2.3 V was performed for 5 minutes. Thereafter, the capacitor was discharged to 0 V at a constant current of 1 A/g (current amount per an active material mass contained in a single electrode), and a capacitance at this time was evaluated. In Table 2, the capacitance (F/g) was shown in terms of a capacitance per an active material mass contained in a single electrode. Further, the energy density $W_D$ (Wh/L) at this time was shown together. In addition, the energy density was calculated by use of the above equation (2).

Results of evaluations are shown in Table 2.

COMPARATIVE EXAMPLE 2

(Preparation of Electrode for Electric Storage Device)

Activated carbon (surface area: approximately 2000 m²/g) derived from a coconut husk, carboxymethyl cellulose (CMC), styrene-butadiene rubber (SBR) and CB were mixed in proportions of 87.0% by mass, 1.7% by mass, 2.6% by mass, and 8.7% by mass, respectively, to obtain a mixture.

A carbon black-based conductive layer was attached onto a surface of a porous body of a three-dimensional network aluminum porous body (average pore diameter 550 μm, thickness 1 mm). Next, the three-dimensional network aluminum porous body was immersed in a solution obtained by dispersing the mixture in water so as to have a ratio of the mixture of 20% by mass, defoamed under reduced pressure, and then drawn up and dried to obtain a loaded body. The loaded body was compressed by roller press to obtain an electrode having a thickness of 700 μm.

(Preparation of Electric Double Layer Capacitor)

A coin (R2032) type electric double layer capacitor was obtained in the same manner as in Example 1. In addition, as the electrolytic solution, a solution obtained by dissolving a TEMA-BF$_4$ salt in PC so as to have a concentration of 1.0 mold, was used.

<Performance Evaluation Test>

A range of a working voltage, a capacitance and an energy density were evaluated in the same manner as in Comparative Example 1.

Results of evaluations are shown in Table 2.

TABLE 2

| | Kneaded Substance | | | | Electrode | | | | Result of Evaluation | | | |
| | | | | | | | | | Range of | | | |
| | | Ratio of Active Material (% by mass) | Ionic Liquid | Binder/ Conductive Aid | Current Collector | | Content of Active Material in Single Electrode (mg) | Thickness of Single Electrode (μm) | Electrolytic Solution Type | Charging Voltage (V) | Working Voltage (V) | Capacitance (F/g) | Energy Density (Wh/L) |
| | Active Material | | | | Type | Average Pore Diameter (μm) | | | | | | | |
|---|---|---|---|---|---|---|---|---|---|---|---|---|---|
| Example 2-1 | singlewall CNT[1] | 7 | EMI—BF$_4$[2] | — | aluminum porous body[3] | 550 | 6.0 | 300 | EMI—BF$_4$ | 3.5 | 0-3.5 | 68 | 3.7 |
| Example 2-2 | singlewall CNT[1] | 17 | EMI—BF$_4$[2] | — | aluminum porous body[3] | 550 | 10.7 | 300 | EMI—BF$_4$ | 3.5 | 0-3.5 | 71 | 5.1 |
| Example 2-3 | singlewall CNT[1] | 27 | EMI—BF$_4$[2] | — | aluminum porous body[3] | 550 | 14.0 | 300 | EMI—BF$_4$ | 3.5 | 0-3.5 | 75 | 7.3 |
| Comparative Example 1 | activated carbon | 80 | — | PTFE/CB | aluminum foil | — | 12.6 | 180 | 1M TEMA—BF$_4$/PC | 2.3 | 0-2.3 | 115 | 6.0 |
| Comparative Example 2 | activated carbon | 87 | — | CMC[4], SBR[5]/CB[6] | aluminum porous body[3] | 550 | 54 | 700 | 1M TEMA—BF$_4$/PC | 2.3 | 0-2.3 | 51 | 11.3 |

[1]Singlewall CNT: "SO-P" (shape: singlewall CNT, average length: 1 to 5 μm, average diameter: 1.4 nm, purity: 98.3% by mass) manufactured by Meijo Nano Carbon Co., Ltd.
[2]EMI—BF$_4$: "1-ethyl-3-methylimidazolium-tetrafluoroborate" manufactured by KISHIDA CHEMICAL Co., Ltd.
[3]Aluminum porous body: three-dimensional network aluminum porous body, average pore diameter: 550 μm, porosity: 95%, thickness: 1.0 mm, weight per unit area: 140 g/m².
[4]CMC: "CMC DAICEL1240" manufactured by DAICEL FINECHEM LTD. (carboxymethyl cellulose).
[5]SBR: "BM-400B" manufactured by ZEON CORPORATION (styrene-butadiene rubber).
[6]CB: "DENKA BLACK" manufactured by DENKI KAGAKU KOGYO KABUSHIKI KAISHA (carbon black).

<Result of Evaluation>

Furthermore, with respect to Examples 2-1 and Comparative Example 1, a discharge capacity maintenance rate (%) to change in current density (A/g) was investigated using a discharge capacity (mAh/g) at the time of discharging at a current of 1 A/g as the reference (100%). Results of evaluations are shown in FIG. 6.

It was found from Table 2 that a capacitance per a unit mass of the active material did not depend on a mixing ratio of the CNT and was constant.

Figure 6:
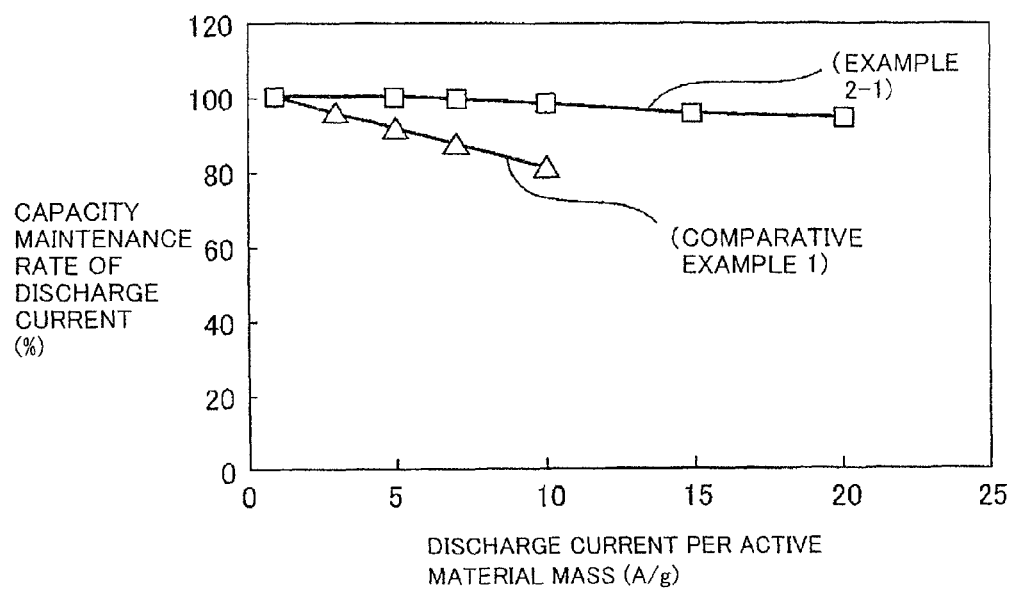
FIG. 6 is a graph showing a relationship between a discharge current and a capacity maintenance rate of the electric double layer capacitor.

It was found from FIG. 6 that the electric double layer capacitor in Example 2-1 did not cause a reduction in discharge capacity even when a density of discharge current was increased.

EXAMPLE 3

In the present examples, the performances of electric double layer capacitors in the case of varying the concentration of an active material (singlewall CNT) existing in a unit volume of an electrode through varying a thickness of the electrode were evaluated.

EXAMPLES 3-1 to 3-4

(Preparation of Kneaded Substance)

A singlewall CNT and EMI-$BF_4$ were used, and a kneaded substance was obtained in the same manner as in Example 1. In addition, the singlewall CNT and the EMI-$BF_4$ were prepared so that an amount of the singlewall CNT was 7% by mass of the total mass of the singlewall CNT and the EMI-$BF_4$.

(Preparation of Electrode for Electric Storage Device)

The kneaded substance was rubbed into three-dimensional network aluminum porous bodies (Examples 3-1, 3-2, 3-4: average pore diameter 550 µm, thickness 1.0 mm, Example 3-3: average pore diameter 850 µm, thickness 1.0 mm) in the same manner as in Example 1. Next, a membrane filter ("Omnipore Membrane" manufactured by Millipore) made of polytetrafluoroethylene was disposed on both surfaces of electrodes, and then the electrodes were uniaxially rolled by applying a pressure of 30 MPa (Example 3-1) or 300 MPa (Examples 3-2, 3-3) to obtain electrodes having a thickness of 285 µm (Example 3-1), 198 µm (Example 3-2) and 158 µm (Example 3-3), respectively.

In Example 3-4, after the above-mentioned membrane filter was disposed on an electrode having a thickness of 1 mm, the electrode was rolled while increasing the applied pressure in stages within a range of 30 to 450 MPa, and finally the membrane filter was removed and the electrode was rolled by applying a pressure of 450 MPa to obtain an electrode having a thickness of 140 µm.

(Preparation of Electric Double Layer Capacitor)

In each example, a coin (R2032) type electric double layer capacitor was obtained in the same manner as in Example 1.

<Performance Evaluation Test>

A capacitance, internal resistance per a unit area and an energy density were evaluated in the same manner as in Example 2.

Results of evaluations of the capacitance and the internal resistance are shown in Table 3.

With respect to the electric double layer capacitors of Examples 3-1 to 3-4 and Comparative Example 1, Ragone plots (per a cell volume, per a cell weight) obtained in the charge and discharge test are shown in FIGS. 4(A) and 4(B). Herein, the cell volume is a capacitor volume not including a coin cell case, and the cell weight is a capacitor weight not including a coin cell case. The charging voltages in Examples 3-1 to 3-4 are 3.5V, and the charging voltage in Comparative Example 1 is 2.3 V.

TABLE 3

| | Kneaded Substance | | | Current Collector | | Electrode | | | | Result of Evaluation | | |
|---|---|---|---|---|---|---|---|---|---|---|---|---|
| | Active Material | Ratio of Active Material (% by mass) | Ionic Liquid | Type | Average Pore Diameter (µm) | Ratio of Active Material (% by mass) | Content of Active Material in Single Electrode (mg) | Thickness of Single Electrode (µm) | Density of Active Material Mass in Single Electrode (g/cm³) | Electrolytic Solution Type | Charging Voltage (V) | Capacitance (F/g) | Internal Resistance (Ω·cm²) |
| Example 3-1 | singlewall CNT[1] | 7 | EMI—$BF_4$[2] | aluminum porous body[3] | 550 | 42 | 18.3 | 285 | 0.33 | EMI—$BF_4$ | 3.5 | 65 | 4.8 |
| Example 3-2 | singlewall CNT[1] | 7 | EMI—$BF_4$[2] | aluminum porous body[3] | 550 | 62 | 16.8 | 198 | 0.44 | EMI—$BF_4$ | 3.5 | 58 | 5.3 |
| Example 3-3 | singlewall CNT[1] | 7 | EMI—$BF_4$[2] | aluminum porous body[7] | 850 | 67 | 15.7 | 158 | 0.52 | EMI—$BF_4$ | 3.5 | 62 | 6.1 |
| Example 3-4 | singlewall CNT[1] | 7 | EMI—$BF_4$[2] | aluminum porous body[3] | 550 | 73 | 14.6 | 140 | 0.55 | EMI—$BF_4$ | 3.5 | 67 | 4.4 |
| Example 2-1 | singlewall CNT[1] | 7 | EMI—$BF_4$[2] | aluminum porous body[3] | 550 | 7 | 6.0 | 300 | 0.11 | EMI—$BF_4$ | 3.5 | 68 | 2.4 |

TABLE 3-continued

| | Kneaded Substance | | | Current Collector | | Electrode | | | | Result of Evaluation | | |
|---|---|---|---|---|---|---|---|---|---|---|---|---|
| | Active Material | Ratio of Active Material (% by mass) | Ionic Liquid | Type | Average Pore Diameter (μm) | Ratio of Active Material (% by mass) | Content of Active Material in Single Electrode (mg) | Thickness of Single Electrode (μm) | Density of Active Material Mass in Single Electrode (g/cm$^3$) | Electrolytic Solution Type | Charging Voltage (V) | Capacitance (F/g) | Internal Resistance (Ω·cm$^2$) |
| Comparative Example 1 | activated carbon | 80 | — | aluminum foil | | 80 | 12.6 | 180 | 0.40 | 1M TEMA—BF$_4$/PC | 2.3 | 115 | 3.5 |

[1] Singlewall CNT: "SO-P" (shape: singlewall CNT, average length: 1 to 5 μm, average diameter: 1.4 nm, purity: 98.3% by mass) manufactured by Meijo Nano Carbon Co., Ltd.
[2] EMI—BF$_4$: "1-ethyl-3-methylimidazolium-tetrafluoroborate" manufactured by KISHIDA CHEMICAL Co., Ltd.
[3] Aluminum porous body: three-dimensional network aluminum porous body, average pore diameter: 550 μm, porosity: 95%, thickness: 1.0 mm, weight per unit area: 140 g/m$^2$.
[7] Aluminum porous body: three-dimensional network aluminum porous body, average pore diameter: 850 μm, porosity: 97%, thickness: 1.0 mm, weight per unit area: 90 g/m$^2$.

<Result of Evaluation>

In Examples 3-1 to 3-4, an energy density became higher than that of the capacitor in Example 2-1 prepared by using a kneaded substance having the same composition. The reason for this may result from the fact that since only the ionic liquid in the kneaded substance having filled into the three-dimensional network aluminum porous body was pushed out of the three-dimensional network aluminum porous body in rolling the electrode, a ratio of the singlewall CNT (density of an active material mass in a single electrode) to the total amount of the singlewall CNT (active material) and the ionic liquid in the three-dimensional network aluminum porous body respectively became 42% by mass, 62% by mass, 67% by mass and 73% by mass, and became higher than a ratio (7% by mass) of the carbon nanotube in the kneaded substance.

Figure 7:
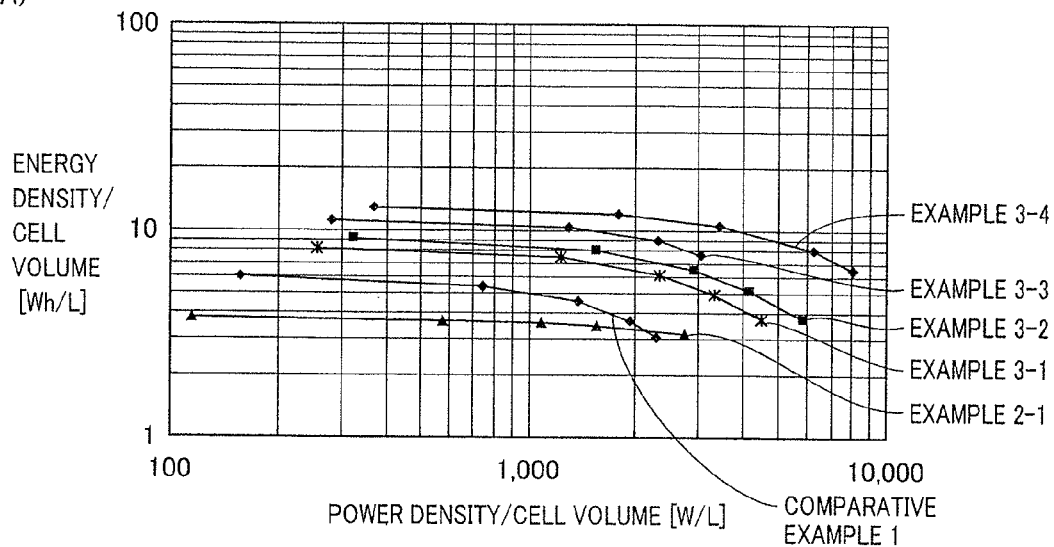
FIG. 7(A) is a graph showing a Ragone plot per a cell volume.
FIG. 7(B) is a graph showing a Ragone plot per a cell weight.
Figure 7:
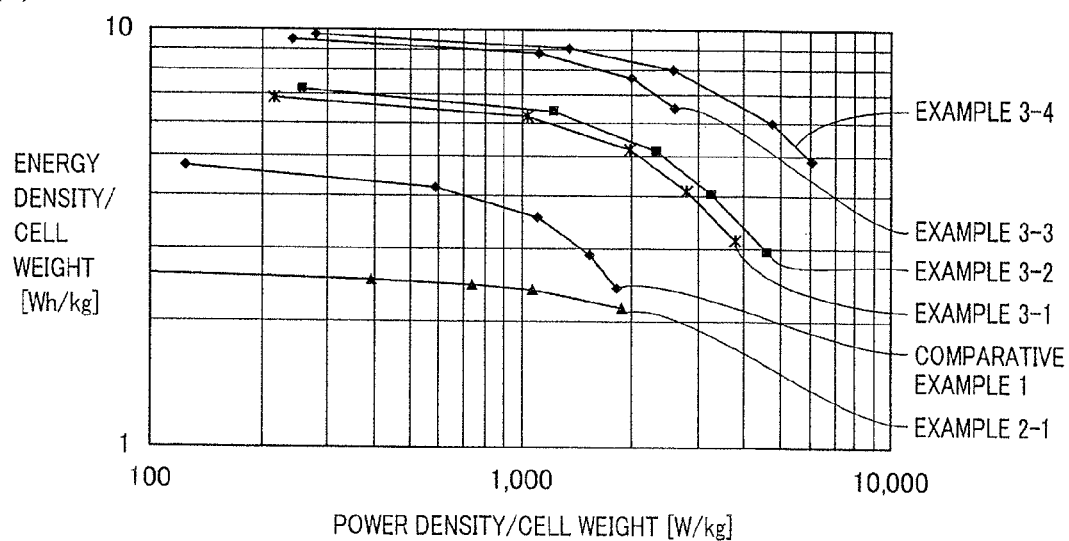

It is found from FIG. 7(A) that an energy density per a cell volume is improved by increasing a CNT density in the electrode.

It is found from FIG. 7(B) that an energy density per a cell weight is improved by increasing a CNT density in the electrode.

EXAMPLE 4

In the present examples, the performances of electric double layer capacitors in the case of using a doublewall carbon nanotube (doublewall CNT) as an active material in a kneaded substance were evaluated.

Examples 4-1 to 4-3

(Preparation of Kneaded Substance)

A doublewall CNT and EMI-BF$_4$ were used, and a kneaded substance was obtained in the same manner as in Example 1. In addition, the doublewall CNT and the EMI-BF$_4$ were prepared so that an amount of the doublewall CNT was 7% by mass (Example 4-1), 17% by mass (Example 4-2) and 27% by mass (Example 4-3), respectively, of the total amount of the doublewall CNT and the EMI-BF$_4$.

(Preparation of Electrode for Electric Storage Device)

In each example, an electrode having a thickness of 300 μm was obtained in the same manner as in Example 1.

(Preparation of Electric Double Layer Capacitor)

In each example, a coin (R2032) type electric double layer capacitor was obtained in the same manner as in Example 1.

<Performance Evaluation Test>

A range of a working voltage, a capacitance and an energy density were evaluated in the same manner as in Example 2. Results of evaluations are shown in Table 4.

TABLE 4

| | Kneaded substance | | | Three-Dimensional Network Metal Porous Body | | Electrode Content of Active | | Result of Evaluation | | | |
|---|---|---|---|---|---|---|---|---|---|---|---|
| | Active Material | Ratio of Active Material (% by mass) | Ionic Liquid | Type | Average Pore Diameter (μm) | Material in Single Electrode (mg) | Thickness of Single Electrode (μm) | Charging Voltage (V) | Range of Working Voltage (V) | Capacitance (F/g) | Energy Density (Wh/L) |
| Example 4-1 | doublewall CNT[8] | 7 | EMI—BF$_4$[2] | aluminum porous body[3] | 550 | 5.0 | 300 | 3.5 | 0-3.5 | 46 | 2.4 |
| Example 4-2 | doublewall CNT[8] | 17 | EMI—BF$_4$[2] | aluminum porous body[3] | 550 | 7.0 | 300 | 3.5 | 0-3.5 | 53 | 3.9 |
| Example 4-3 | doublewall CNT[8] | 27 | EMI—BF$_4$[2] | aluminum porous body[3] | 550 | 10.5 | 300 | 3.5 | 0-3.5 | 48 | 3.9 |

[2] EMI—BF$_4$: "1-ethyl-3-methylimidazolium-tetrafluoroborate" manufactured by KISHIDA CHEMICAL Co., Ltd.
[3] Aluminum porous body: three-dimensional network aluminum porous body, average pore diameter: 550 μm, porosity: 95%, thickness: 1.0 mm, weight per unit area: 140 g/m$^2$.
[8] Doublewall CNT: "NC2100" (shape: doublewall CNT, average length: 5 μm, average diameter: 3.5 nm, specific surface area: 500 m$^2$/g, purity: 90% by mass) manufactured by Nanocyl.

<Result of Evaluation>

It can be determined from the results of the capacitances per a unit mass in Table 4 that a degree of subdivision of the doublewall CNT by shear force is lower than that of the singlewall CNT though a specific surface area of the doublewall CNT is 1.3 times larger than that of the singlewall CNT. However, it became apparent that a kneaded substance similar to the singlewall CNT can be prepared and functions as an electrode even if the doublewall CNT is used.

EXAMPLE 5

In the present examples, the performances of electric double layer capacitors in the case of using a carbon nanohorn (CNH) and an opened carbon nanohorn (hereinafter, also referred to as an opened CNH) as an active material in a kneaded substance were evaluated.

EXAMPLES 5-1 to 5-3, 5-5 to 5-7

(Preparation of Kneaded Substance)

A CNH or an opened CNH and EMI-BF$_4$ were used, and a kneaded substance was obtained in the same manner as in Example 1. In addition, the CNH or the opened CNH and the EMI-BF$_4$ were prepared so that an amount of the CNH or the opened CNH was 7% by mass (Examples 5-1 and 5-5), 17% by mass (Examples 5-2 and 5-6) and 27% by mass (Examples 5-3 and 5-7), respectively, of the total amount of the CNH or the opened CNH and the EMI-BF$_4$.

(Preparation of Electrode for Electric Storage Device)

In each example, an electrode having a thickness of 300 μm was obtained in the same manner as in Example 1.

(Preparation of Electric Double Layer Capacitor)

In each example, a coin (R2032) type electric double layer capacitor was obtained in the same manner as in Example 1.

EXAMPLES 5-4, 5-8

An electrode was obtained and an electric double layer capacitor was prepared in the same manner as in Example 3-2 except for using the CNH or the opened CNH as an active material.

<Performance Evaluation Test>

A range of a working voltage, a capacitance, an energy density and internal resistance were evaluated in the same manner as in Example 2. Results of evaluations are shown in Table 5.

TABLE 5

| | Kneaded Substance | | | Three-Dimensional Network Metal Porous Body | | Electrode | | | Result of Evaluation | | | | |
|---|---|---|---|---|---|---|---|---|---|---|---|---|---|
| | Active Material | Ratio of Active Material (% by mass) | Ionic Liquid | Type | Average Pore Diameter (μm) | Ratio of Active Material in Single Electrode (% by mass) | Content of Active Material in Single Electrode (mg) | Thickness of Single Electrode (μm) | Charging Voltage (V) | Range of Working Voltage (V) | Capacitance (F/g) | Energy Density (Wh/L) | Internal Resistance (Ω·cm$^2$) |
| Example 5-1 | CNH[14] | 7 | EMI—BF$_4$[2] | aluminum porous body[3] | 550 | 7 | 3.5 | 300 | 3.5 | 0-3.5 | 58 | 1.4 | 12 |
| Example 5-2 | CNH[14] | 17 | EMI—BF$_4$[2] | aluminum porous body[3] | 550 | 17 | 9.3 | 300 | 3.5 | 0-3.5 | 70 | 4.6 | 5.3 |
| Example 5-3 | CNH[14] | 27 | EMI—BF$_4$[2] | aluminum porous body[3] | 550 | 27 | 12 | 300 | 3.5 | 0-3.5 | 81 | 6.8 | 5.3 |
| Example 5-4 | CNH[14] | 17 | EMI—BF$_4$[2] | aluminum porous body[3] | 550 | 60 | 26 | 280 | 3.5 | 0-3.5 | 56 | 9.8 | 6.2 |
| Example 5-5 | opened CNH[15] | 7 | EMI—BF$_4$[2] | aluminum porous body[3] | 550 | 7 | 2.4 | 300 | 3.5 | 0-3.5 | 93 | 1.6 | 39 |
| Example 5-6 | opened CNH[15] | 17 | EMI—BF$_4$[2] | aluminum porous body[3] | 550 | 17 | 11 | 300 | 3.5 | 0-3.5 | 98 | 7.5 | 3.7 |
| Example 5-7 | opened CNH[15] | 27 | EMI—BF$_4$[2] | aluminum porous body[3] | 550 | 27 | 12 | 300 | 3.5 | 0-3.5 | 110 | 9.2 | 4.6 |
| Example 5-8 | opened CNH[15] | 17 | EMI—BF$_4$[2] | aluminum porous body[3] | 550 | 50 | 28 | 330 | 3.5 | 0-3.5 | 96 | 18 | 4.9 |

[2]EMI—BF$_4$: "1-ethyl-3-methylimidazolium-tetrafluoroborate" manufactured by KISHIDA CHEMICAL Co., Ltd.
[3]Aluminum porous body: three-dimensional network aluminum porous body, average pore diameter: 550 μm, porosity: 95%, thickness: 1.0 mm, weight per unit area: 140 g/m$^2$.
[14]CNH: carbon nanohorn, "CNH" manufactured by NEC Corporation.
[15]Opened CNH: opened carbon nanohorn, "CNHox" manufactured by NEC Corporation.

<Result of Evaluation>

The electric double layer capacitor in Example 5-1 did not exhibit an original capacitance of the CNH and had large internal resistance. On the other hand, in Examples 5-2 to 5-4, the energy density was increased as the content of the CNH in the electrode was increased. The reason for this may be that a contact area between the CNHs and a contact area between the CNH and the three-dimensional network metal porous body were increased as the content of the CNH in the electrode was increased.

In Examples 5-5 to 5-8, the energy density of the capacitor was increased as the content of the opened CNH in the electrode was increased. Moreover, the capacitors in Examples 5-5 to 5-8 in which the opened CNH was used had a larger capacitance and a larger energy density than those of the capacitors in Examples 5-1 to 5-4 in which the CNH was used. The reason for this may be that a surface area of the CNH contributing to the capacitance was increased by virtue of an opening treatment.

EXAMPLE 6

In the present examples, the performances of electric double layer capacitors in the case of using a carbon nanotube with open ends as an active material were evaluated.

EXAMPLES 6-1 to 6-4

(Preparation of Carbon Nanotube with Open Ends)

A singlewall CNT ("SO-P" manufactured by Meijo Nano Carbon Co., Ltd.) was subjected to a heat treatment using a tubular furnace to prepare a carbon nanotube with open ends. The heat treatment was performed in an environment in which pure air was flown in at a flow rate of 1 L/minute. A temperature raising rate was set at 1° C./minute, and the upper limit temperature was set at 650° C. (Example 6-1), 600° C. (Example 6-2), and 550° C. (Example 6-3), respectively. In Example 6-4, the upper limit temperature was set at 550° C., and the carbon nanotube was maintained at 550° C. for 1 hour after reaching 550° C.

(Preparation of Kneaded Substance)

The carbon nanotube with open ends of each example and $EMI-BF_4$ were used, and a kneaded substance was obtained in the same manner as in Example 1. In addition, the carbon nanotube with open ends and the $EMI-BF_4$ were prepared so that an amount of the carbon nanotube was 7% by mass of the total mass of the carbon nanotube and the $EMI-BF_4$.

(Preparation of Electrode for Electric Storage Device)

In each example, an electrode having a thickness of 300 μm was obtained in the same manner as in Example 1.

(Preparation of Electric Double Layer Capacitor)

In each example, a coin (R2032) type electric double layer capacitor was obtained in the same manner as in Example 1.

<Evaluation Test>

A yield and a specific surface area of each obtained carbon nanotube with open ends were evaluated. The specific surface area was evaluated by nitrogen absorption-desorption measurement using BELSORP-max manufactured by BEL Japan, Inc. The specific surface area was evaluated from an absorption-desorption isothermal curve obtained from this measurement using the Brunauer-Emmett-Teller method (BET method) and a t-plot method.

A capacitance of the electric double layer capacitor was obtained in the same manner as in Example 2.

Results of evaluations are shown in Table 6.

TABLE 6

| | | Kneaded Substance | | | | | | Three-Dimensional Network Metal Porous Body | | Electrode | | Result of Evaluation | | |
|---|---|---|---|---|---|---|---|---|---|---|---|---|---|---|
| | | Active Material | | | | | | | | | | | | |
| | Type | BET Specific Surface Area $(m^2/g)$ | Outer Specific Surface Area $(m^2/g)$ | Inner Specific Surface Area $(m^2/g)$ | Yield (%) | Ratio of Active Material (% by mass) | Ionic Liquid | Type | Average Pore Diameter (μm) | Thickness of Single Electrode (μm) | Charging Voltage (V) | Capacitance (F/g) | Energy Density (Wh/L) | Internal Resistance $(\Omega \cdot cm^2)$ |
| Example 6-1 | CNT with open ends | 1150 | — | — | 11 | — | — | — | — | — | — | — | — | — |
| Example 6-2 | CNT with open ends | 1122 | 304 | 948 | 75 | 7 | EMI—$BF_4$[2] | aluminum porous body[3] | 550 | 300 | 3.5 | 102 | 4.5 | 2.8 |
| Example 6-3 | CNT with open ends | 1000 | 312 | 864 | 88 | 7 | EMI—$BF_4$[2] | aluminum porous body[3] | 550 | 300 | 3.5 | 97 | 4.3 | 3.3 |
| Example 6-4 | CNT with open ends | 1000 | 309 | 877 | 56 | 7 | EMI—$BF_4$[2] | aluminum porous body[3] | 550 | 300 | 3.5 | 99 | 4.1 | 6.3 |
| Example 2-1 | singlewall CNT[1] | 390 | 360 | — | — | 7 | EMI—$BF_4$[2] | aluminum porous body[3] | 550 | 300 | 3.5 | 68 | 3.7 | 2.4 |

[1]Singlewall CNT: "SO-P" (shape: singlewall CNT, average length: 1 to 5 μm, average diameter: 1.4 nm, purity: 98.3% by mass) manufactured by Meijo Nano Carbon Co., Ltd.
[2]EMI—$BF_4$: "1-ethyl-3-methylimidazolium-tetrafluoroborate" manufactured by KISHIDA CHEMICAL Co., Ltd.
[3]Aluminum porous body: three-dimensional network aluminum porous body, average pore diameter: 550 μm, porosity: 95%, thickness: 1.0 mm, weight per unit area: 140 g/m².

<Result of Evaluation>

In Example 6-1, a yield of the carbon nanotube with open ends was as low as 11%, and therefore it is considered that the singlewall CNT reached a burning temperature of a carbon nanotube itself at 650° C. On the other hand, an increase in specific surface area was slight as compared with Example 6-2, and therefore a heat treatment condition of the carbon nanotube in Example 6-1 was determined to be inappropriate.

An increase in inner specific surface area associated with an increase in heat treatment temperature can be verified from the specific surface area calculated by the t-plot method. However, in Example 6-1, the yield was decreased sharply, while the increase in specific surface area was slight. In Example 6-4, the specific surface area was not increased even though the temperature was maintained after temperature rising. Accordingly, the heat treatment condition of Example 6-2 was determined to be appropriate for increasing the specific surface area.

The capacitance of the electric double layer capacitor was increased as the specific surface area of the carbon nanotube was increased. Among these, the electric double layer capacitor in Example 6-2 exhibited about 1.5 times larger capacitance than the capacity of the electric double layer capacitor in Example 2-1 in which an untreated carbon nanotube was used.

EXAMPLE 7

In the present examples, the performances of electric double layer capacitors in the case of varying the average pore diameter of a three-dimensional network metal porous body were evaluated.

EXAMPLES 7-1 to 7-4

(Preparation of Kneaded Substance)

A singlewall CNT and EMI-$BF_4$ were used, and a kneaded substance was obtained in the same manner as in Example 1. In addition, the singlewall CNT and the EMI-$BF_4$ were prepared so that an amount of the singlewall CNT was 7% by mass of the total mass of the singlewall CNT and the EMI-$BF_4$.

(Preparation of Electrode for Electric Storage Device)

Three-dimensional network aluminum porous bodies (average pore diameter 450 μm (Example 7-1), 550 μM (Example 7-2), 650 μM (Example 7-3), 850 μM (Example 7-4), each having a thickness of 1.0 mm) were prepared, and the kneaded substance was rubbed into each of the porous bodies in the same manner as in Example 1 to obtain electrodes having a thickness of 1 mm. Next, the obtained electrodes were uniaxially rolled in the same manner as in Example 3 to obtain electrodes having a thickness of 199 μm (Example 7-1), 191 μm (Example 7-2), 219 μm (Example 7-3) and 196 μm (Example 7-4), respectively. In addition, the press pressure at this time was set at 150 MPa.

(Preparation of Electric Double Layer Capacitor)

In each example, a coin (R2032) type electric double layer capacitor was obtained in the same manner as in Example 1.

<Performance Evaluation Test>

A range of a working voltage, a capacitance and internal resistance were evaluated in the same manner as in Example 2. In addition, a volume that is used as a reference for a capacitance (F/$cm^3$) was a capacitor volume without including a coin cell case.

Figure 8:
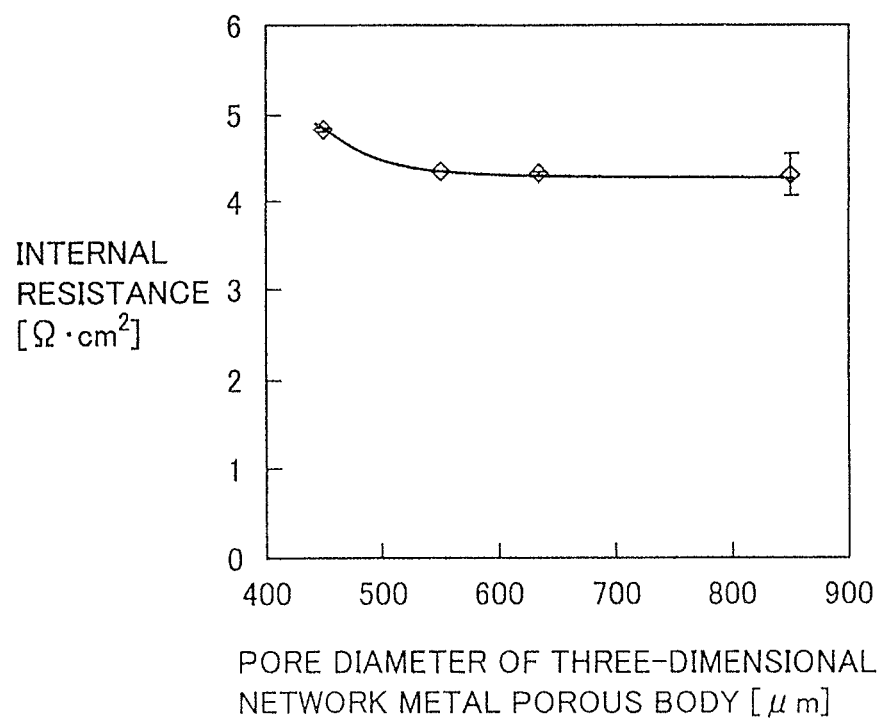
FIG. 8 is a graph showing internal resistance of an electric double layer capacitor vs. a pore diameter of a three-dimensional network aluminum porous body.

Results of evaluations are shown in Table 7 and FIG. 8.

TABLE 7

| | Kneaded Substance | | | Three-Dimensional Network Metal Porous Body | | Electrode Content of Active | | Result of Evaluation | | | |
|---|---|---|---|---|---|---|---|---|---|---|---|
| | Active Material | Ratio of Active Material (% by mass) | Ionic Liquid | Type | Average Pore Diameter (μm) | Material in Single Electrode (mg) | Thickness of Single Electrode (μm) | Charging Voltage (V) | Range of Working Voltage (V) | Capacitance (F/$cm^3$) | Internal Resistance ($\Omega \cdot cm^2$) |
| Example 7-1 | singlewall CNT[1] | 7 | EMI—$BF_4$[2] | aluminum porous body | 450 | 14.8 | 199 | 3.5 | 0-3.5 | 10.7 | 4.8 |
| Example 7-2 | singlewall CNT[1] | 7 | EMI—$BF_4$[2] | aluminum porous body | 550 | 14.2 | 191 | 3.5 | 0-3.5 | 10.6 | 4.4 |
| Example 7-3 | singlewall CNT[1] | 7 | EMI—$BF_4$[2] | aluminum porous body | 650 | 15.4 | 219 | 3.5 | 0-3.5 | 10.4 | 4.3 |
| Example 7-4 | singlewall CNT[1] | 7 | EMI—$BF_4$[2] | aluminum porous body | 850 | 15.1 | 196 | 3.5 | 0-3.5 | 11.4 | 4.3 |

[1]Singlewall CNT: "SO-P" (shape: singlewall CNT, average length: 1 to 5 μm, average diameter: 1.4 nm, purity: 98.3% by mass) manufactured by Meijo Nano Carbon Co., Ltd.
[2]EMI—$BF_4$: "1-ethyl-3-methylimidazolium-tetrafluoroborate" manufactured by KISHIDA CHEMICAL Co., Ltd.

<Result of Evaluation>

It was found from FIG. 8 that in a range of 450 μm or more and 850 μm or less of an average pore diameter of the three-dimensional network aluminum porous body, a capacitance of the capacitor was increased slightly as the average pore diameter was increased. Moreover, it was found that when the average pore diameter of the three-dimensional network aluminum porous body was 550 μm or more, internal resistance of the capacitor was constant, but when the average pore diameter of the three-dimensional network aluminum porous body was less than 550 μm, the internal resistance was increased as the average pore diameter was decreased.

EXAMPLE 8

In the present examples, the performances of electric double layer capacitors in the case of using graphene and a singlewall CNT as an active material in a kneaded substance were evaluated.

EXAMPLES 8-1 to 8-3

(Preparation of Kneaded Substance)

A singlewall CNT, graphene and EMI-BF$_4$ were used, and a kneaded substance was obtained in the same manner as in Example 1. In addition, the singlewall CNT, the graphene and the EMI-BF$_4$ were prepared so that a ratio of the graphene and a ratio of the singlewall CNT to the total mass of the singlewall CNT, the graphene and the EMI-BF$_4$ were 0.7% by mass and 6.3% by mass, respectively, in Example 8-1; 3.5% by mass and 3.5% by mass, respectively, in Example 8-2; and 0.7% by mass and 6.3% by mass, respectively, in Example 8-3.

(Preparation of Electrode for Electric Storage Device)

In each of Examples 8-1 and 8-2, an electrode having a thickness of 300 μm was obtained in the same manner as in Example 1.

In Example 8-3, an electrode having a thickness of 188 μm was obtained in the same manner as in Example 3-2. In addition, in Table 8, a content of an active material of an electrode represents a ratio of the singlewall CNT and a ratio of the graphene to the total amount of the singlewall CNT, the graphene and the EMI-BF$_4$.

(Preparation of Electric Double Layer Capacitor)

In each example, a coin (R2032) type electric double layer capacitor was obtained in the same manner as in Example 1.

<Performance Evaluation>

A range of a working voltage, a capacitance, an energy density and internal resistance were evaluated in the same manner as in Example 1.

Results of evaluations are shown in Table 8.

TABLE 8

| | Kneaded Substance | | | Three-Dimensional Network Metal Porous Body | | Electrode Content of Active | | Result of Evaluation | | | |
|---|---|---|---|---|---|---|---|---|---|---|---|
| | Active Material | Ratio of Active Material (% by mass) | Ionic Liquid | Type | Average Pore Diameter (μm) | Material in Single Electrode (mg) | Thickness of Single Electrode (μm) | Charging Voltage (V) | Range of Working Voltage (V) | Capacitance (F/g) | Energy Density (Wh/L) |
| Example 8-1 | graphene[10] singlewall CNT[1] | 0.7 6.3 | EMI—BF$_4$[2] | aluminum porous body[3] | 550 | graphene: 0.7 singlewall CNT: 6.3 | 300 | 3.5 | 0-3.5 | 61 | 3.3 |
| Example 8-2 | graphene[10] singlewall CNT[1] | 3.5 3.5 | EMI—BF$_4$[2] | aluminum porous body[3] | 550 | graphene: 3.5 singlewall CNT: 3.5 | 300 | 3.5 | 0-3.5 | 40 | 2.6 |
| Example 8-3 | graphene[10] singlewall CNT[1] | 0.7 6.3 | EMI—BF$_4$[2] | aluminum porous body[7] | 550 | graphene: 6 singlewall CNT: 60 | 188 | 3.5 | 0-3.5 | 63 | 9.7 |

[1]Singlewall CNT: "SO-P" (shape: singlewall CNT, average length: 1 to 5 μm, average diameter: 1.4 nm, purity: 98.3% by mass) manufactured by Meijo Nano Carbon Co., Ltd.
[2]EMI—BF$_4$: "1-ethyl-3-methylimidazolium-tetrafluoroborate" manufactured by KISHIDA CHEMICAL Co., Ltd.
[3]Aluminum porous body: three-dimensional network aluminum porous body, average pore diameter: 550 μm, porosity: 95%, thickness: 1.0 mm, weight per unit area: 140 g/m$^2$.
[7]Aluminum porous body: three-dimensional network aluminum porous body, average pore diameter: 850 μm, porosity: 97%, thickness: 1.0 mm, weight per unit area: 90 g/m$^2$.
[10]Graphene: "GRAPHENE FLOWER" manufactured by Incubation Alliance Inc.

<Result of Evaluation>

The capacitors in Examples 8-1 and 8-2 were respectively a capacitor using the singlewall CNT and the graphene as an active material, and an energy density thereof was 90% of the energy density of the capacitor in Example 2-1 in which only the singlewall CNT was used as an active material. The reason for this may result from ratios (0.7% by mass, 6.3% by mass) of the graphene and the carbon nanotube in the kneaded substance.

In Example 8-3, an energy density became higher than that of the capacitor in Example 8-1 prepared by using a kneaded substance having the same composition. The reason for this may result from the fact that since only the ionic liquid in the kneaded substance having filled into the three-dimensional network aluminum porous body was pushed out of the three-dimensional network aluminum porous body in rolling the electrode, a ratio of the graphene and a ratio of the singlewall CNT to the total amount of the singlewall CNT, the graphene and the ionic liquid in the three-dimensional network aluminum porous body became 6% by mass and 60% by mass, respectively, and became higher than a ratio (0.7% by mass) of the graphene and a ratio (6.3% by mass) of the carbon nanotube in the kneaded substance.

EXAMPLE 9

In the present examples, the performances of electric double layer capacitors in the case where an organic solvent and a binder are contained in a kneaded substance were evaluated.

EXAMPLES 9-1 to 9-3

(Preparation of Kneaded Substance)

EMI-BF$_4$, PC and PVdF-HFP were mixed in proportions of 76 : 15 : 8 (Example 9-1) or 62 : 31 : 7 (Example 9-2) in terms of by mass to obtain a mixed solution.

Further, EMI-BF$_4$ and PVdF-HFP were mixed in proportions of 90:10 in terms of % by mass to obtain a mixed solution (Example 9-3).

A singlewall CNT was added to each mixed solution so that an amount of the singlewall CNT was 7% by mass of the total amount of the singlewall CNT and the EMI-BF$_4$ or the singlewall CNT, the EMI-BF$_4$ and the PC, and the resulting mixture was kneaded for 10 minutes by use of a mortar to obtain a kneaded substance.

(Preparation of Electrode for Electric Storage Device)

By use of the kneaded substance in each example, an electrode having a thickness of 300 μm was obtained in the same manner as in Example 1.

(Preparation of Electric Double Layer Capacitor)

In each example, a coin (R2032) type electric double layer capacitor was obtained in the same manner as in Example 1. In addition, for the electrolytic solution, a solution obtained by mixing EMI-BF$_4$ and PC at the same ratio as in Preparation of Kneaded Substance in each example was used.

<Performance Evaluation>

Figure 9:
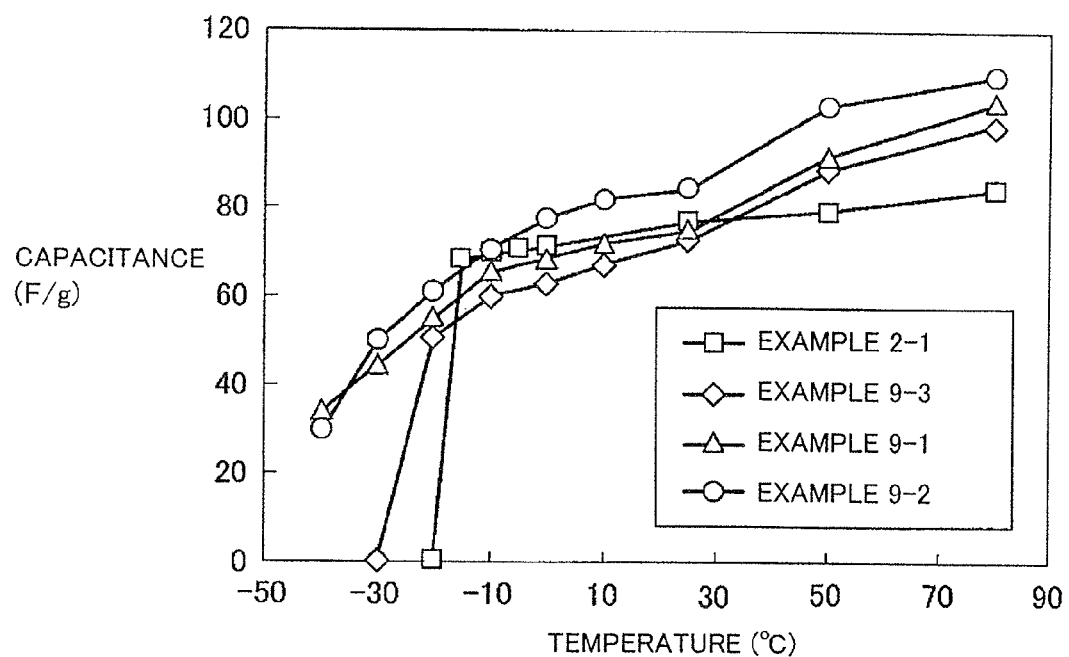
FIG. 9 is a graph showing temperature characteristic of the electric double layer capacitor.

An environmental temperature was varied in a range of −40° C. to 80° C., and a capacitance was evaluated in the same manner as in Example 1 at each temperature. In addition, a range of a working voltage ranged from 0 V to 3.5 V. Further, similar evaluations were also performed on the capacitor in Example 2-1 as a comparison. Results of evaluations are shown in FIG. 9. In FIG. 9, the capacitance (F/g) was represented by a capacitance per an active material mass contained in a single electrode.

Next, a capacitance was evaluated in the same manner as in Example 1 at an environmental temperature of 25° C. Further, similar evaluations were also performed on the capacitor in Example 2-1 as a comparison. Results of evaluations are shown in Table 9. In Table 9, the capacitance (F/g) was represented by a capacitance per an active material mass contained in a single electrode.

<Result of Evaluation>

From FIG. 9, in the electric double layer capacitors in Examples 9-1 and 9-2 that were prepared by using the kneaded substance containing PC, a reduction in capacitance was suppressed even in a low-temperature region, and low-temperature characteristics were improved. The reason for this may result from the fact that the organic solvent decreases viscosity of the ionic liquid.

From FIG. 9, the capacitors in Examples 9-1 and 9-2, which used the kneaded substance containing a carbon nanotube, an ionic liquid, an organic solvent and a binder, were equivalent in capacitance per an active material mass of the capacitor to those of the capacitors prepared in Examples 2 and 3 that used an active material and an active material containing only an ionic liquid, respectively.

EXAMPLE 10

In the present example, the performance of a lithium-ion capacitor using the electrode of the present invention was evaluated.

EXAMPLE 10

(Preparation of Positive Electrode)

A singlewall CNT and 1-ethyl-3-methylimidazolium-fluoromethanesulfonylimide (EMI-FSI) were prepared so that an amount of the singlewall CNT was 7% by mass of the total amount of the singlewall CNT and the EMI-FSI. Then, the singlewall CNT and the EMI-FSI were kneaded for 10 minutes by use of a mortar to obtain a kneaded substance for a positive electrode.

A three-dimensional network aluminum porous body (average pore diameter 550 μm, thickness 1.0 mm) was prepared and compressed to have a thickness of 500 μm by roll press. Then, the kneaded substance for a positive electrode was placed on a top surface of the three-dimensional network aluminum porous body, and the kneaded substance was rubbed into the porous body toward a lower surface of the porous body by use of a squeegee to prepare a positive electrode.

TABLE 9

| | Kneaded Substance | | | | | Three-Dimensional Network Metal Porous Body | | Electrode Content of Active | | Result of Evaluation | | |
|---|---|---|---|---|---|---|---|---|---|---|---|---|
| | | Ratio of Active Material (% by mass) | Ionic Liquid | Organic Solvent | Binder | Type | Average Pore Diameter (μm) | Material in Single Electrode (mg) | Thickness (μm) | Charging Voltage (V) | Range of Working Voltage (V) | Capacitance (F/g) |
| | Active Material | | | | | | | | | | | |
| Example 9-1 | singlewall CNT[1] | 7 | EMI—BF$_4$[2] | PC[11] | PVdF—HFP[12] | aluminum porous body[3] | 550 | 5.0 | 300 | 3.5 | 0-3.5 | 75 |
| Example 9-2 | singlewall CNT[1] | 7 | EMI—BF$_4$[2] | PC[11] | PVdF—HFP[12] | aluminum porous body[3] | 550 | 5.0 | 300 | 3.5 | 0-3.5 | 84 |
| Example 9-3 | singlewall CNT[1] | 7 | EMI—BF$_4$[2] | — | PVdF—HFP[12] | aluminum porous body[3] | 550 | 4.2 | 300 | 3.5 | 0-3.5 | 72 |

[1]Singlewall CNT: "SO-P" (shape: singlewall CNT, average length: 1 to 5 μm, average diameter: 1.4 nm, purity: 98.3% by mass) manufactured by Meijo Nano Carbon Co., Ltd.
[2]EMI-BF$_4$: "1-ethyl-3-methylimidazolium-tetrafluoroborate" manufactured by KISHIDA CHEMICAL Co., Ltd.
[3]Aluminum porous body: three-dimensional network aluminum porous body, average pore diameter: 550 μm, porosity: 95%, thickness: 1.0 mm, weight per unit area: 140 g/m$^2$.
[11]PC: "propylene carbonate" manufactured by KISHIDA CHEMICAL Co., Ltd.
[12]PVdF-HFP: "Kynar Flex 2801" (polyvinylidene fluoride-hexafluoropropylene copolymer) manufactured by Arkema.

(Preparation of Negative Electrode)

Hard carbon and EMI-FSI were prepared so that an amount of the hard carbon was 7% by mass of the total amount of the hard carbon and the EMI-FSI, and a kneaded substance for a negative electrode was obtained in the same manner as in the kneaded substance for a positive electrode.

A three-dimensional network nickel porous body (average pore diameter 480 µm, porosity 95%, thickness 1.4 mm) was prepared and compressed to have a thickness of 200 µm by roll press. Then, the kneaded substance for a negative electrode was placed on a top surface of the three-dimensional network nickel porous body, and a negative electrode was prepared in the same manner as in the positive electrode.

(Preparation of Lithium-Ion Capacitor)

Two electrodes of the positive electrode and the negative were punched out in the shape of a circle of 15 mm in diameter, these electrodes were opposed with a separator made of cellulose fibers ("TF 4035" manufactured by NIPPON KODOSHI CORPORATION, thickness 35 µm) interposed therebetween, and housed in a R2032 type coin cell case. In addition, a lithium metal foil was previously attached to a surface of the negative electrode opposed to the positive electrode by pressure. A thickness of the lithium metal foil was set so as to have 90% of a difference between the positive electrode capacity derived from the amount of the singlewall CNT filled into the three-dimensional network aluminum porous body and the negative electrode capacity derived from the amount of the hard carbon filled into the nickel porous body (difference=negative electrode capacity–positive electrode capacity).

Then, as an electrolytic solution, a solution obtained by dissolving lithium-bis(trifluoromethanesulfonyl)imide (LiTFSI) in EMI-FSI in a concentration of 1.0 mol/L was poured into the coin cell case, and then an end of the case was sealed to prepare a coin type electric double layer capacitor.

Next, the lithium ion capacitor was left to stand at an environmental temperature of 60° C. for 40 hours for lithium doping. It was determined that lithium-doping was completed at the time when a difference in potential between the positive electrode and the negative electrode becomes equal to or below 2 V.

<Performance Evaluation Test>

The lithium-ion capacitor was charged within a voltage range shown in Table 10 at a constant current of 1 A/g (current amount per an active material mass in a positive electrode) at an environmental temperature of 25° C., and then discharged at a constant current of 1 A/g (current amount per an active material mass in a positive electrode), and a discharge capacity and an energy density were evaluated. In Table 10, a discharge capacity (mAh/g) was shown in terms of a discharge capacity per an active material mass contained in a positive electrode. In addition, the energy density $W_D$ (Wh/L) was calculated by use of the above equation (2). Results of evaluations are shown in Table 10.

COMPARATIVE EXAMPLE 3-1

(Preparation of Positive Electrode)

Activated carbon (surface area: approximately 2000 m$^2$/g) derived from a coconut husk, carbon black (conductive aid component) and polytetrafluoroethylene (binder component) were mixed in proportions of 80:10:10 in terms of % by mass, and the resulting mixture was rolled to prepare a positive electrode made of an activated carbon sheet having a thickness of 0.18 mm.

(Preparation of Negative Electrode)

Hard carbon, carboxymethyl cellulose (CMC), styrene-butadiene rubber (SBR) and carbon black (CB) were mixed in proportions of 87% by mass, 2% by mass, 3% by mass, and 8% by mass, respectively, to obtain a mixture. A solution obtained by dispersing the resulting mixture in water so as to have a solid ratio of 30% by mass was applied to a copper foil having a thickness of 10 µm and dried, and then a thickness of the copper foil was adjusted by roll press to prepare a negative electrode having a thickness of 110 µm.

(Preparation of Lithium-Ion Capacitor)

A lithium-ion capacitor was prepared in the same manner as in Example 10 by using the obtained positive electrode and negative electrode. In addition, as an electrolytic solution, a solution obtained by dissolving LiPF$_6$ in a solvent in which ethylene carbonate and diethyl carbonate were mixed in proportions by volume of 1:1 in a concentration of 1.0 mol/L was used.

<Performance Evaluation Test>

A discharge capacity and an energy density were evaluated in the same manner as in Example 10. Results of evaluations are shown in Table 10.

COMPARATIVE EXAMPLE 3-2

(Preparation of Positive Electrode)

Activated carbon (surface area: approximately 2000 m$^2$/g) derived from a coconut husk, carboxymethyl cellulose (CMC), styrene-butadiene rubber (SBR) and carbon black (CB) were mixed in proportions of 87% by mass, 2% by mass, 3% by mass, and 8% by mass, respectively, to obtain a mixture for a positive electrode.

A carbon black-based conductive layer was attached onto a surface of a porous body of a three-dimensional network aluminum porous body (average pore diameter 550 µm, thickness 1 mm). Next, the three-dimensional network aluminum porous body was immersed in a solution obtained by dispersing the mixture for a positive electrode in water so as to have a ratio of the mixture of 20% by mass, defoamed under reduced pressure, and then drawn up and dried to obtain a loaded body. The loaded body was compressed by roller press to obtain a positive electrode having a thickness of 580 µm.

(Preparation of Negative Electrode)

A mixture for a negative electrode was obtained in the same manner as in the mixture for a positive electrode except for changing the activated carbon to hard carbon.

A carbon black-based conductive layer was attached onto a surface of a porous body of a three-dimensional network nickel porous body (average pore diameter 480 µm, porosity 95%, thickness 1.4 mm). Next, the three-dimensional network nickel porous body adjusted to have a thickness of 0.4 mm was immersed in a solution obtained by dispersing the mixture for a negative electrode in water so as to have a ratio of the mixture of 20% by mass, defoamed under reduced pressure, and then drawn up and dried to obtain a loaded body. The loaded body was compressed by roller press to obtain a negative electrode having a thickness of 220 µm.

(Preparation of Lithium-Ion Capacitor)

A lithium-ion capacitor was prepared in the same manner as in Example 10 by using the positive electrode and the negative electrode. In addition, as an electrolytic solution, a solution obtained by dissolving LiPF$_6$ in a solvent in which ethylene carbonate and diethyl carbonate were mixed in proportions by volume of 1:1 in a concentration of 1.0 mol/L was used.

<Performance Evaluation Test>

A discharge capacity and an energy density were evaluated in the same manner as in Example 10. Results of evaluations are shown in Table 10.

COMPARATIVE EXAMPLE 3-3

(Preparation of Lithium-Ion Capacitor)

A lithium-ion capacitor was prepared in the same manner as in Comparative Example 3-2 except for changing the hard carbon to be used for the negative electrode of Comparative Example 3-2 to graphite.

<Performance Evaluation Test>

A discharge capacity and an energy density were evaluated in the same manner as in Example 10. Results of evaluations are shown in Table 10.

EXAMPLES 11-1 to 11-8

(Preparation of Kneaded Substance)

A CNH, a singlewall CNT and EMI-BF$_4$ were used, and a kneaded substance was obtained in the same manner as in Example 1. In addition, the CNH, the singlewall CNT and the EMI-BF$_4$ were prepared so that a ratio of the CNH and a ratio of the singlewall CNT to the total mass of the CNH, the singlewall CNT and the EMI-BF$_4$ were 0% by mass and 17% by mass, respectively, in Example 11-1 and Example 11-7; 3.4% by mass and 116% by mass, respectively, in Example 11-2 and Example 11-6; 8.5% by mass and 8.5% by mass, respectively, in Example 11-3; 13.6% by mass and 3.4% by mass, respectively, in Example 11-4; and 17% by mass and 0% by mass, respectively, in Example 11-5 and Example 11-8.

TABLE 10

| | | Kneaded Substance | | | | Three-Dimensional Network Metal Porous Body | Electrode | | | | Result of Evaluation | |
|---|---|---|---|---|---|---|---|---|---|---|---|---|
| | | Active Material | Ratio of Active Material (% by mass) | Ionic Liquid | Binder/Conductive Aid | Type | Average Pore Diameter (μm) | Content of Active Material in Positive Electrode | Thickness of Single Electrode (μm) | Electrolytic Solution | Range of Working Voltage (V) | Charging Voltage (V) | Discharge Current Capacity (mAh/g) | Energy Density (Wh/L) |
| Example 10 | Positive Electrode | singlewall CNT[1] | 7 | EMI—FSI[2] | — | aluminum porous body[3] | 550 | 4.1 | 500 | EMI—FSI, LiTFSI | 2.0-5.0 | 5.0 | 39.8 | 36.4 |
| | Negative Electrode | hard carbon[13] | 7 | EMI—FSI[2] | — | aluminum porous body[12] | 480 | — | 200 | | | | | |
| Comparative Example 3-1 | Positive Electrode | | | | — | | | 34.4 | 180 | LiPF$_6$, EC, DEC | 2.0-4.2 | 4.2 | 10.8 | 9.7 |
| | Negative Electrode | | | | — | | | hard carbon-containing paste is applied to a steel foil | | | | | | |
| Comparative Example 3-2 | Positive Electrode | activated carbon | 87 | — | CMC, SBR, CB | aluminum porous body[3] | 550 | 121 | 285 | LiPF$_6$, EC, DEC | 2.0-4.2 | 4.2 | 7.7 | 5.4 |
| | Negative Electrode | hard carbon[13] | 87 | — | CMC, SBR, CB | aluminum porous body[12] | 480 | — | 200 | | | | | |
| Comparative Example 3-3 | Positive Electrode | activated carbon | 87 | — | CMC, SBR, CB | aluminum porous body[3] | 550 | 121 | 285 | LiPF$_6$, EC, DEC | 2.0-4.2 | 4.2 | 7.7 | 5.3 |
| | Negative Electrode | graphite | 87 | — | CMC, SBR, CB | aluminum porous body[12] | 480 | — | 200 | | | | | |

[1]Singlewall CNT: "SO-P" (shape: singlewall CNT, average length: 1 to 5 μm, average diameter: 1.4 nm, purity: 98.3% by mass) manufactured by Meijo Nano Carbon Co., Ltd.
[2]EMI—BF$_4$: "1-ethyl-3-methylimidazolium-tetrafluoroborate" manufactured by KISHIDA CHEMICAL Co., Ltd.
[3]Aluminum porous body: three-dimensional network aluminum porous body, average pore diameter: 550 μm, porosity: 95%, thickness: 1.0 mm, weight per unit area: 140 g/m$^2$.
[12]Nickel porous body: "Celmet (registered trademark)" manufactured by Sumitomo Electric Industries, Ltd.
[13]Hard carbon: average particle diameter 3 μm.

EXAMPLE 11

In the present examples, the performances of electric double layer capacitors in the case of using a CNH, a singlewall CNT, and a mixture of a CNH and a singlewall CNT, respectively, as an active material in a kneaded substance were evaluated.

(Preparation of Electrode for Electric Storage Device)

In Examples 11-1 to 11-5, an electrode having a thickness of 300 μm was obtained in the same manner as in Example 1.

In Examples 11-6 to 11-8, an electrode having a thickness of 280 μm to 310 μm was obtained in the same manner as in Example 3-2. In addition, in Table 11, a ratio (% by mass) of an active material in a single electrode represents a ratio of the CNH and a ratio of the singlewall CNT to the total amount of the singlewall CNT, the CNH and the EMI-BF$_4$.

(Preparation of Electric Double Layer Capacitor)

In each example, a coin (R2032) type electric double layer capacitor was obtained in the same manner as in Example 1.

<Performance Evaluation>

In each example, a capacitance, an energy density and internal resistance were evaluated in the same manner as in Example 2.

Results of evaluations are shown in Table 11.

length enters the space between the singlewall CNTs to increase a contact area between the CNH and the singlewall CNT, and therefore a surface area contributing to a capacity is increased.

The capacitor in Example 11-8 in which only the CNH was used had a larger energy density and smaller internal resistance than the capacitor in Example 11-7 in which only the singlewall CNT was used. The reason for this may be that a length of the CNH is smaller than that of the singlewall CNT

TABLE 11

| | Kneaded Substance | | | Electrode | | | | | | |
|---|---|---|---|---|---|---|---|---|---|---|
| | | Ratio of Active Material (% by mass) | Ionic Liquid | Three-Dimensional Network Metal Porous Body | | Ratio of Active Material in Single Electrode (% by mas) | Thickness of Single Electrode (µm) | Result of Evaluation | | |
| | Active Material | | | Type | Average Pore Diameter (µm) | | | Charging Voltage (V) | Capacitance (F/g) | Energy Density (Wh/L) | Internal Resistance (Ω·cm$^2$) |
| Example 11-1 | CNH[14] singlewall CNT[1] | 0 17 | EMI—BF$_4$[2] | aluminum porous body[3] | 550 | CNH:0 CNT:17 | 300 | 3.5 | 66 | 3.4 | 2.5 |
| Example 11-2 | CNH[14] singlewall CNT[1] | 3.4 13.6 | EMI—BF$_4$[2] | aluminum porous body[3] | 550 | CNH:3.4 CNT:13.6 | 300 | 3.5 | 80 | 3.8 | 2.9 |
| Example 11-3 | CNH[14] singlewall CNT[1] | 8.5 8.5 | EMI—BF$_4$[2] | aluminum porous body[3] | 550 | CNH:8.5 CNT:8.5 | 300 | 3.5 | 73 | 4.3 | 3.3 |
| Example 11-4 | CNH[14] singlewall CNT[1] | 13.6 3.4 | EMI—BF$_4$[2] | aluminum porous body[3] | 550 | CNH:13.6 CNT:3.4 | 300 | 3.5 | 76 | 4.8 | 3.7 |
| Example 11-5 | CNH[14] singlewall CNT[1] | 17 0 | EMI—BF$_4$[2] | aluminum porous body[3] | 550 | CNH:17 CNT:0 | 300 | 3.5 | 70 | 4.6 | 5.3 |
| Example 11-6 | CNH[14] singlewall CNT[1] | 3.4 13.6 | EMI—BF$_4$[2] | aluminum porous body[3] | 550 | CNH:13 CNT:50 | 280 | 3.5 | 74 | 13 | 5.5 |
| Example 11-7 | CNH[14] singlewall CNT[1] | 0 17 | EMI—BF$_4$[2] | aluminum porous body[3] | 550 | CNH:0 CNT:60 | 310 | 3.5 | 60 | 10 | 6.1 |
| Example 11-8 | CNH[14] singlewall CNT[1] | 17 0 | EMI—BF$_4$[2] | aluminum porous body[3] | 550 | CNH:60 CNT:0 | 300 | 3.5 | 56 | 9.8 | 6.2 |

[1]Singlewall CNT: "SO-P" (shape: singlewall CNT, average length: 1 to 5 µm, average diameter: 1.4 nm, purity: 98.3% by mass) manufactured by Meijo Nano Carbon Co., Ltd.
[2]EMI—BF$_4$: "1-ethyl-3-methylimidazolium-tetrafluoroborate" manufactured by KISHIDA CHEMICAL Co., Ltd.
[3]Aluminum porous body: three-dimensional network aluminum porous body, average pore diameter: 550 µm, porosity: 95%, thickness: 1.0 mm, weight per unit area: 140 g/m$^2$.
[14]CNH: carbon nanohorn, "CNH" manufactured by NEC Corporation.

<Result of Evaluation>

The electric double layer capacitors in Examples 11-2 to 11-4 in which the CNH and the singlewall CNT were mixed and used had a larger capacitance and smaller internal resistance than the capacitor in Example 11-5 in which only the CNH was used.

The capacitors in Examples 11-2 and 11-4 had a larger capacitance and a larger energy density than the capacitor in Example 11-1 in which only the singlewall CNT was used.

The electric double layer capacitor in Example 11-6 in which the CNH and the singlewall CNT were mixed and used had a larger capacitance, a larger energy density and smaller internal resistance than the capacitor in Example 11-7 in which only the singlewall CNT was used and the capacitor in Example 11-8 in which only the CNH was used.

The reason for these results may be that when both of the CNH and the singlewall CNT are used, the CNH with smaller and therefore a ratio of the active material in the single electrode of the CNH becomes higher than that of the singlewall CNT after compression.

Further, a paste made of the CNH singly had lower viscosity than that made of the singlewall CNT singly. The reason for this may be that a length of the CNH is generally smaller than that of the singlewall CNT and therefore a contact area between the CNHs is small. Accordingly, it was found that the CNH can be held more stably in the three-dimensional network aluminum porous body by being mixed with the singlewall CNT. Moreover, it was found that the capacitor prepared by using this mixed paste exhibits a higher capacity and a higher energy density than the capacitor made of the singlewall CNT singly or the CNH singly. The reason for this may be that by mixing the CNH with the singlewall CNT, a contact area among the CNH, the singlewall CNT and the three-dimensional network aluminum porous body is increased, and therefore a surface area contributing to a capacitance is increased as compared with the CNH singly.

An electric storage device using the electrode for an electric storage device of the present invention can be used in various applications including transport equipments such as automobiles, railroads and the like.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An electrode for an electric storage device comprising:
   a three-dimensional network metal porous body having an average pore diameter of 50 μm or more and 1000 μm or less,
   an active material containing carbon nanotube, and optionally at least one selected from the group consisting of activated carbon, hard carbon, graphite, graphene and a carbon nanohorn; and
   an ionic liquid,
   wherein said active material and said ionic liquid are kneaded to obtain a kneaded substance and said kneaded substance is contained in a pore of said three-dimensional network metal porous body.

2. The electrode for an electric storage device according to claim 1, wherein said active material contains carbon nanotube and at least one selected from the group consisting of activated carbon, hard carbon, graphite, graphene and a carbon nanohorn.

3. The electrode for an electric storage device according to claim 1, wherein said active material is a carbon nanotube.

4. The electrode for an electric storage device according to claim 1, wherein a metal of said three-dimensional network metal porous body contains at least one selected from the group consisting of aluminum, nickel, copper, an aluminum alloy and a nickel alloy.

5. The electrode for an electric storage device according to claim 1, wherein the metal of said three-dimensional network metal porous body is aluminum.

6. The electrode for an electric storage device according to claim 1, wherein said electrode for an electric storage device does not contain a binder component.

7. The electrode for an electric storage device according to claim 1, wherein said ionic liquid contains an organic solvent.

8. The electrode for an electric storage device according to claim 1, wherein said carbon nanotube has a shape in which both ends of the carbon nanotube are opened.

9. The electrode for an electric storage device according to claim 1, wherein said carbon nanotube has an average length in a range of 100 nm or more and 2000 μm or less.

10. The electrode for an electric storage device according to claim 1, wherein said carbon nanotube has an average diameter in a range of 0.1 nm or more and 50 nm or less.

11. The electrode for an electric storage device according to claim 1, wherein said carbon nanotube has a purity of 70% by mass or more.

12. An electric storage device comprising the electrode for an electric storage device according to claim 1.

13. The electric storage device according to claim 12, wherein said electric storage device is an electric double layer capacitor or a lithium-ion capacitor.

14. A manufacturing method of an electrode for an electric storage device comprising the step of:
    kneading an active material containing a carbon nanotube and optionally at least one selected from the group consisting of activated carbon, hard carbon, graphite, graphene and a carbon nanohorn with an ionic liquid to produce a kneaded substance; and
    allowing said kneaded substance to be contained in a pore of a three-dimensional network metal porous body having an average pore diameter of 50 μm or more and 1000 μm or less.

* * * * *